(12) United States Patent
Komatsu et al.

(10) Patent No.: US 7,267,904 B2
(45) Date of Patent: Sep. 11, 2007

(54) NONAQUEOUS SECONDARY ELECTROLYTIC BATTERY

(75) Inventors: Shigeo Komatsu, Kyoto (JP); Hiroshi Mukai, Kyoto (JP); Tetsuya Murai, Kyoto (JP); Shinya Kitano, Kyoto (JP); Mikio Okada, Kyoto (JP); Hiroshi Nakahara, Valencia, CA (US); Mikito Nagata, Valencia, CA (US); Hiroyuki Yumoto, Valencia, CA (US)

(73) Assignee: GS Yuasa Corporation, Kyoto (JP)

( * ) Notice: Subject to any disclaimer, the term of this patent is extended or adjusted under 35 U.S.C. 154(b) by 586 days.

(21) Appl. No.: 10/712,530

(22) Filed: Nov. 14, 2003
(Under 37 CFR 1.47)

(65) Prior Publication Data
US 2004/0096735 A1    May 20, 2004

Related U.S. Application Data

(62) Division of application No. 09/582,868, filed as application No. PCT/JP99/06135 on Nov. 4, 1999, now Pat. No. 6,797,429.

(30) Foreign Application Priority Data

| Nov. 6, 1998 | (JP) | ............................. P. 10-315967 |
| Dec. 4, 1998 | (JP) | ............................. P. 10-344976 |
| Mar. 29, 1999 | (JP) | ............................. P. 11-85155 |
| Mar. 29, 1999 | (JP) | ............................. P. 11-85171 |
| Mar. 29, 1999 | (JP) | ............................. P. 11-85208 |
| Mar. 29, 1999 | (JP) | ............................. P. 11-85270 |
| Mar. 29, 1999 | (JP) | ............................. P. 11-86977 |
| Mar. 30, 1999 | (JP) | ............................. P. 11-88072 |
| Mar. 30, 1999 | (JP) | ............................. P. 11-88251 |
| Mar. 30, 1999 | (JP) | ............................. P. 11-88599 |

(51) Int. Cl.
*H01M 8/02* (2006.01)
*H01M 2/08* (2006.01)
*H01M 2/02* (2006.01)
*H01M 2/00* (2006.01)

(52) U.S. Cl. ...................... 429/176; 429/185; 429/178; 429/179; 429/171; 429/164; 429/163; 429/162; 429/94

(58) Field of Classification Search ................ 429/176, 429/185, 178, 179, 171, 164, 163, 162, 94
See application file for complete search history.

(56) References Cited

U.S. PATENT DOCUMENTS 4,092,464 A    5/1978    Dey et al.

(Continued)

FOREIGN PATENT DOCUMENTS

EP    0 862 227 A1    9/1998

OTHER PUBLICATIONS

Patent Abstracts of Japan: vol. 1997, No. 11, Nov. 18, 1997: JP 9-199099A, (Japan Storage Battery Co., Ltd.), Jul. 31, 1997.

*Primary Examiner*—Patrick Joseph Ryan
*Assistant Examiner*—Angela J. Martin
(74) *Attorney, Agent, or Firm*—Sughrue Mion, PLLC

(57) ABSTRACT

A nonaqueous secondary electrolytic battery comprising an electricity-generating element formed by spirally winding a laminate of a positive electrode plate, a separating material and a negative electrode plate, and an electrolytic solution with which the separating material, if it is a separator, is impregnated. The electricity-generating element is sealed in a battery case formed by a resin-laminated sheet comprising a metal layer as a barrier layer. Only a pair of lead terminals are drawn to the exterior of the battery case. The resin sheet comprises an oriented resin layer laminated on both surfaces of the metal layer. The inner heat-fused layers are opposed and heat-fused to each other. A molten and solidified resin mass is formed protruding from the inner end of the welded portion toward the inner space of the battery by 0.1 mm or more. Alternatively, the welded portion is formed thinner at the outer end thereof than at the inner end thereof.

9 Claims, 19 Drawing Sheets

U.S. PATENT DOCUMENTS

| | | | |
|---|---|---|---|
| 4,997,732 A * | 3/1991 | Austin et al. | 429/153 |
| 6,042,966 A * | 3/2000 | Cheu | 429/163 |
| 6,106,973 A * | 8/2000 | Sonozaki et al. | 429/162 |
| 6,428,934 B1 * | 8/2002 | Hatazawa et al. | 429/231.95 |
| 6,461,757 B1 | 10/2002 | Sasayama et al. | |
| 6,797,430 B1 * | 9/2004 | Hatta et al. | 429/181 |

FOREIGN PATENT DOCUMENTS

| | | |
|---|---|---|
| EP | 0 862 230 A2 | 9/1998 |
| EP | 0 983 145 A2 | 8/1999 |
| JP | 5-159803 A | 6/1993 |
| JP | P3240650 B2 | 6/1993 |
| JP | 8-83596 A | 3/1996 |
| JP | 9-213285 A | 8/1997 |
| JP | 10-144352 A | 5/1998 |
| JP | 10-157008 | 6/1998 |
| JP | 10-241744 A | 9/1998 |
| JP | 10-270072 | 10/1998 |
| JP | 11-204088 A | 7/1999 |
| JP | 11-219689 A | 8/1999 |
| JP | 11-233075 | 8/1999 |
| JP | 11-265732 A | 9/1999 |
| JP | 11-312505 | 11/1999 |
| WO | WO86-03060 A | 5/1986 |

* cited by examiner

NONAQUEOUS SECONDARY ELECTROLYTIC BATTERY

TECHNICAL FIELD

This is a divisional of application Ser. No. 09/582,868 filed Jan. 25, 2001, which is a 35 U.S.C. § 371 of International Application No. PCT/JP99/06135 filed Nov. 4, 1999 now U.S. Pat. No. 6,797,429; the disclosures of which are incorporated herein by reference.

The present invention relates to a battery comprising a case formed by a resin sheet.

TECHNICAL BACKGROUND

In recent years, electronic apparatus such as portable wireless telephone, portable personal computer and portable video camera have been developed, and various electronic apparatus have been reduced in size to an extent such that they are portable. This requires the use of batteries having a high energy density and a light weight as batteries to be incorporated in these electronic apparatus. A typical battery that satisfies these requirements is a nonaqueous secondary electrolytic battery comprising as a negative electrode material a lithium intercalation compound having lithium metal, lithium alloy or lithium ion occluded in a carbon-based material as a host material (The term "host material" as used herein is meant to indicate a material capable of occluding and releasing lithium ion), as a positive electrode material a compound which undergoes reversible electrochemical reaction with lithium ion such as lithium-cobalt composite oxide and as an electrolytic solution an aprotic organic solvent having a lithium salt such as $LiClO_4$ and $LiPF_6$ dissolved therein.

This nonaqueous secondary electrolytic battery comprises a negative electrode plate having a negative electrode compound containing the foregoing negative electrode material retained on a negative electrode collector as a support, a positive electrode plate having a positive electrode compound containing the foregoing positive electrode material retained on a positive electrode collector as a support and a separating material provided interposed between the negative electrode plate and the positive electrode plate. The separating material often means a separator for retaining the electrolytic solution as well as interposing between the negative electrode plate and the positive electrode plate to prevent the shortcircuiting of the two electrodes. However, a solid electrolyte which is disposed between the negative electrode plate and the positive electrode plate to prevent shortcircuiting as well as cause ionic conduction, too, is called a separating material.

The foregoing positive electrode plate and negative electrode plate, which are each in the form of thin sheet, are laminated on each other or spirally wound normally with a separating material interposed therebetween to form an electricity-generating element. The electricity-generating element thus is received in a battery case made of a metal such as stainless steel, nickel-plated iron or aluminum into which an electrolytic solution is then injected. The battery case is then hermetically sealed with a cover plate to assemble a battery.

The use of such a metallic battery case provides a high airtightness and an excellent mechanical strength but puts great restrictions on the reduction of the weight of the battery and the selection of the shape of the battery.

As an approach for solving the foregoing problem there has been proposed a structure comprising an electricity-generating element received in a battery case made of a resin sheet. This structure is advantageous in that it can reduce the weight of the battery and enhance the degree of selection of the shape of the battery. On the other hand, this structure has the following disadvantages and problems awaiting solution.

(a) A structure comprising as the foregoing resin sheet a resin sheet made of a laminate of a metal foil and a heat-fusible resin layer is advantageous particularly in that it gives a high airtightness. However, when the resin sheet is welded under tension, the metal foil undergoes cracking, deteriorating the sealing properties of the resin sheet. Thus, water enters into the battery, reducing the life of the battery.

(b) The structure having a battery case formed by this kind of a resin sheet is liable to peeling of the welded portion of the ends of the sheet which are superimposed on each other with the rise in the inner pressure of the battery. The metal-resin sheet exhibits a sufficiently enhanced airtightness in the direction perpendicular to the metal foil. However, the exterior and the interior of the battery case are separated not by the metal foil but by the resin layer sandwiched by two sheets of metal foil at the welded portion of the ends of the sheet which are superimposed on each other. Thus, water content and electrolytic components can easily pass though the resin layer.

(c) The production of this kind of a battery is often carried out by a process which comprises putting an electricity-generating element provided with lead terminals into an open battery case made of a resin sheet, injecting an electrolytic solution into the battery case, and then welding the opening portion of the battery case with the lead terminals put between the two sides of the opening portion to seal the battery case. However, since the electrolytic solution hits and bounces off the electricity-generating element or is attached to the lead terminals during injection into the battery case, welding is occasionally carried out with the electrolytic solution attached to the area of the resin sheet to be welded. This also causes the deterioration of the sealing properties.

(d) The spirally-wound electricity-generating element, if used, can be easily loosed when received in a battery case made of a resin sheet unlike in the metallic case. Eventually, the gap between the various electrode plates cannot be kept constant over an extended period of time. Accordingly, this structure tends to show an decrease of discharge capacity after repeated charge-discharge cycles.

(e) At the first step of forming a battery case from a resin sheet, two parallel sides of the resin sheet are welded to each other to form a cylinder. However, the welded portion protrudes from the battery case when the battery is assembled. Thus, this protrusion interferes in the accumulation of a plurality of the batteries. Accordingly, the accumulation of these batteries can easily produce an unnecessary space or takes time to compress the stack of these batteries so that the protrusion doesn't interfere.

(f) In this structure, the electricity-generating element is subject to less pressure than the conventional case comprising a metallic case. Accordingly, in the case where the battery comprising a case made of a resin sheet is used in a vibrational atmosphere, the electricity-generating element can easily move in the battery case, occasionally breaking the lead terminals at the point between the fixed area at the heat-welded portion and the electricity-generating element. Further, since the electricity-generating element is subject to small pressure, there occurs nonuniformity in the distance between electrodes in the electricity-generating element, causing the deterioration of charge-discharge properties.

The present invention has been worked out in the light of the foregoing circumstances. An object of the present invention is to provide a battery having a long life which exhibits a sufficiently enhanced airtightness while attaining the reduction of the weight of the battery case made of a resin sheet. Another object of the present invention is to prevent the welded portion of the two ends of resin sheet from interfering in the accumulation of batteries, enhancing the volume energy density of the entire battery. A still another object of the present invention is to prevent the breakage of lead terminals in the battery case.

DISCLOSURE OF THE INVENTION

The battery according to the invention comprises the following elements: an electricity-generating element comprising a positive electrode plate and a negative electrode plate which are disposed opposed to each other with a separating material interposed therebetween and lead terminals connected to the respective electrode plates and a battery case made of a resin sheet (formed by laminating an oriented resin layer on both surfaces of a metal layer) which is open in one or two directions before sealing and then welded at its openings with the foregoing electricity-generating element received therein and the foregoing lead terminals inserted through one of the openings to seal the case.

As the metal layer constituting the resin sheet there may be used an aluminum foil, aluminum alloy foil, titanium foil or the like. The number of the resin layers and metal layers constituting the resin sheet is not limited to one. Two or more resin layers and metal layers may be used to form the resin sheet. The resin layer may be in the form of a multi-layer structure comprising layers of the same or different materials. The structure of the resin sheet is not limited to resin layer-metal layer-resin layer structure but may be resin layer-resin layer-metal layer-resin layer structure or resin layer-metal layer-resin layer-metal layer-resin layer structure. In short, the metal layer is little liable to cracking to provide improvements in sealing properties so far as a resin layer which has been oriented is provided on both surfaces of the metal layer. The term "provided on both surfaces of the metal layer" as used herein does not necessarily mean that the resin layer comes in contact with the metal layer. For example, the resin sheet may have an oriented resin layer-unoriented resin layer-metal layer-unoriented resin layer-oriented resin layer structure. Thus, the structure having a thin unoriented resin layer is substantially included in the present invention.

In order to weld the opening of the resin sheet, it is necessary that a thermoplastic high molecular material such as polyethylene, polypropylene and polyethylene terephthalate be present on the surface layer of the resin sheet.

In a preferred embodiment of the electricity-generating element to be used in the invention, a positive electrode plate and a negative electrode plate are wound with a separating material interposed therebetween to make an ellipsoidal coil having an ellipsoidal section almost perpendicular to the axis thereof. However, the present invention is not limited to this shape. The electricity-generating element according to the invention may be in any form such as coil having a circular or noncircular section, stack of flat electrode plates with a separating material interposed therebetween and stack of sheet-shaped electrodes folded with a separating material interposed therebetween. The term "ellipsoid" as used herein is meant to indicate a shape obtained by combining a nearly semi-arch portion and a nearly linear portion in such an arrangement that a pair of opposing semi-arc portions are connected to each other at the ends thereof with two parallel linear portions.

In the case where an ellipsoidally wound electricity-generating element is received in the battery case made of a resin sheet which is open in one or two directions, the winding axis of the ellipsoidally wound electricity-generating element is preferably perpendicular to the plane of the opening of the unsealed battery case. The term "perpendicular" as used herein means not only "completely perpendicular" but also "almost perpendicular".

The electricity-generating element according to the invention comprises a positive electrode, a negative electrode and a separating material in combination. The positive electrode plate is prepared by applying a positive electrode compound obtained by mixing an active positive electrode material, a binder and an electrically-conducting agent described later to one or both surfaces of an electrically-conductive sheet-shaped or foil-shaped collector, and then drying the coated material. The negative electrode plate is prepared by applying a negative electrode compound obtained by mixing an active negative electrode material and a binder described later to one or both surfaces of an electrically-conductive sheet-shaped or foil-shaped collector, and then drying the coated material.

In the case where the separating material prevents the shortcircuiting of the two electrodes, it is usual that the electrolytic solution is injected into the battery case prior to sealing of the battery case. However, the electricity-generating element may comprise in combination a positive electrode, a negative electrode and a solid electrolyte which also acts as a separating material. The foregoing solid electrolyte may be an organic material, an inorganic material or a combination thereof or may be a high molecular electrolyte or porous material impregnated with an electrolytic solution.

As a nonaqueous electrolytic solution to be used as an electrolyte there may be used a known material. Examples of such a nonaqueous electrolytic solution include polar solvents such as ethylene carbonate, propylene carbonate, dimethyl carbonate, diethyl carbonate, γ-butyrolactone, sulfolane, dimethylsulfoxide, acetonitrile, dimethylformamide, dimethylacetamide, 1,2-dimethoxyethane, 1,2-diethoxyethane, tetrahydrofuran, 2-methyltetrahydrofuran, dioxolane and methyl acetate, and mixture thereof.

Examples of lithium salt to be dissolved in the organic solvent include salts such as $LiPF_6$, $LiClO_4$, $LiBF_4$, $LiAsF_6$, $LiCF_3CO_2$, $LiCF_3SO_3$, $LiN(SO_2CF_3)$, $LiN(SO_2CF_2CF_3)$, $LiN(COCF_3)$ and $LiN(COCF_2CF_3)_2$, and mixture thereof.

Further, an electrolyte layer mainly composed of an organic material, an inorganic material or a mixture thereof may be formed on the upper surface of the positive electrode compound layer and/or negative electrode compound layer. The electrolyte layer is essentially required to be chemically or electrochemically stable in the battery and have a raised mechanical strength. The electrolyte layer is preferably made of a solid electrolyte. However, the electrolyte layer doesn't need to be made of a single component as a whole. Further, the electrolyte layer doesn't need to be made of an electrolyte as a whole. For example, a solid electrolyte which has been impregnated with an electrolytic solution to have an enhanced conductivity or a known separating material impregnated with an electrolyte may be used. In other words, lithium ion can be smoothly transferred at the interface of the electrolyte layer with the electrode plates or in the electrolyte plate through the electrolytic solution. However, if an organic electrolytic solution is contained in the electrolyte layer, the charging voltage cannot be raised beyond the decomposition voltage of the organic electrolytic solution, restricting the range of selection of the active material to be used. Accordingly, an electrolyte layer free of organic electrolytic solution is preferably used to enhance the degree of freedom of selection of materials.

When an organic solid material such as polyethylene oxide, polyacrylonitrile, polyethylene glycol and modification product thereof is used as a constituent of the solid electrolyte, little cracking occurs during winding because such an organic solid material is lighter and more flexible than inorganic solid materials. On the other hand, when the constituent of the solid electrolyte is a lithium-ionically conductive inorganic solid material such as lithium-lanthanum perovskite and lithium-ioncially conductive glass, the resulting solid electrolyte exhibits a high heat resistance and hence an excellent reliability at high temperatures.

In addition, when the constituent of the electrolyte layer is a mixture of an organic material and an inorganic material, the resulting electrolyte layer allows the two components to compensate for defect of the other while accomplishing the advantage of the two components. In other words, even if the organic material in the mixture melts, it can be retained by the inorganic material and thus doesn't flow away. Even when the inorganic material is contained in a large amount, the organic material acts as a binder, making it possible to prevent cracking. In the case where the constituent of the electrolyte layer is a mixture, if one of the components of the mixture is an electrolyte, the other may be a nonelectrolyte which is an inorganic material (inorganic filler) such as magnesium oxide, silicon oxide and calcium salt of silicon oxide or a mixture thereof. The mixture may comprise an inorganic material in an amount of from 70 to 85%, an organic solid material in an amount of from 10 to 15%, and the balance of other components (e.g., binder such as polyvinylidene fluoride). An electrolyte salt may or may not be used depending on the constitution.

As the separating material constituting the electricity-generating element according to the invention there may be used an insulating polyethylene microporous membrane impregnated with an electrolytic solution, high molecular electrolyte or gel electrolyte comprising a high molecular electrolyte impregnated with an electrolytic solution. Alternatively, an insulating microporous membrane, a high molecular solid electrolyte, etc. may be used in combination. When a porous high molecular solid electrolyte layer is used as a high molecular solid electrolyte, the electrolyte with which the high molecular material is impregnated may be different from the electrolyte to be incorporated in the pores.

The active positive electrode material is not specifically limited. Examples of an inorganic compound to be used as such an active positive electrode material include composite oxide represented by the composition formula $Li_xMO_2$ or $Li_yM_2O_4$ (wherein M represents a transition metal, x represents a number of from 0 to 1, both inclusive, and y represents a number of from 0 to 2, both inclusive), oxide having tunnel-like pores, and laminar metal chalcogen compound. Specific examples of these inorganic compounds include $LiCoO_2$, $LiNiO_2$, $LiMn_2O_4$, $Li_2Mn_2O_4$, $MnO_2$, $FeO_2$, $V_2O_5$, $V_6O_{13}$, $TiO_2$, and $TiS_2$. Examples of an organic compound to be used as an active positive electrode material include electrically-conductive polymers such as polyaniline. The foregoing various active materials may be used in admixture regardless of which they are inorganic or organic.

The active negative electrode material is not specifically limited. Examples of the active negative electrode material employable herein include oxides of Al, Si, Pb, Sn, Zn and Cd, alloy of these metals with lithium, transition metal oxides such as $LiFe_2O_3$, $WO_2$ and $MoO_2$, carbon-based materials such as graphite and carbon, lithium nitrides such as $Li_5(Li_3N)$, metal lithium foil, and mixture thereof.

In the case where the two ends of the opening of the resin sheet are welded to each other to seal the battery case, the sealing properties of the battery case can be further enhanced by melting and solidifying the resin to form a mass at the welded portion more inside the battery case than the inner end of the welded portion.

The battery case made of a resin sheet employable herein may be in any form such as cylindrical laminate case formed by heat-fusing a metal-laminated resin film, case obtained by heat-fusing four sides of two metal-laminated resin sheets, case obtained by double-folding a resin sheet and heat-fusing three sides of the folded sheet, and cup-shaped laminate case obtained by press-molding a metal-laminated resin sheet such that the electricity-generating element can be received.

In order to enhance the sealing properties of the battery case, the thickness of the welded portion at which two edges of the opening of the resin sheet are welded to each other to seal the battery case may be predetermined smaller at the outer end of the battery case than at the inner end of the battery case. It is thought that the reduction of the thickness of the outer end reduces the contact area with the atmosphere, enhancing the sealing properties.

In the case where a battery case made of a resin sheet which has been sealed with the foregoing electricity-generating element received in the interior thereof is prepared, it is preferred that two parallel sides of a rectangular resin sheet are opposed and welded to each other to form a cylinder which is open in two directions (this welded portion will be hereinafter referred to as "welded portion X"). With the lead terminals of the foregoing electricity-generating element put in one of the two openings, the two edges, of the openings are then opposed and welded to each other to form a sealed bag, thereby forming a structure having the surface of the welded portion X fixed to the surface of the battery case. By fixing the welded portion X to the surface of the battery case, the welded portion X can be prevented from protruding from the battery case. Thus, no unnecessary space can be produced when a plurality of batteries are stacked. Further, this structure facilitates stacking of batteries.

Similarly, in the case where a bag-shaped battery case made of a resin sheet which has been sealed with an electricity-generating element received in the interior thereof is prepared, the battery case is prepared by welding two parallel sides of a rectangular resin sheet opposed to each other to form a cylinder which is open in two directions (this welded portion will be hereinafter referred to as "welded portion X"). With the lead terminals of the foregoing electricity-generating element put in one of the two openings, the two edges of the openings are then opposed and welded to each other to form a sealed bag (the portion welded with the lead terminals put therein will be hereinafter referred to as "welded portion Y", and the other welded portion will be hereinafter referred to as "welded portion Z"), thereby forming a structure having the surface of the welded portion X fixed to the surface of the welded portion Y and/or welded portion Z. In this arrangement, too, the welded portion X can be prevented from protruding from the battery case. Thus, no unnecessary space can be produced when a plurality of batteries are stacked. Further, this structure facilitates stacking of batteries.

In order to fix the welded portion X to the surface of the battery case or the welded portion Y and/or welded portion Z, a proper adhesive agent may be used depending on the material of the resin sheet. Alternatively, they may be heat-fused to each other.

In the case where a fixing tape is wound on the coiled electricity-generating element along its winding axis, the welded portion X of the battery case is preferably positioned so as to partly overlaps the fixing tape. The coiled electricity-generating element is always pressed at the portion where the welded portion X and the fixing tape overlap each other, keeping the distance between the electrodes constant during charge-discharge cycle and hence minimizing the decrease of capacity with the increase of the number of cycles.

In the case of battery provided with bent lead terminals, the lead terminals are preferably curved at a radius of from 0.5 mm to 4 mm. When the radius of curvature falls below 0.5 mm, the lead terminals can easily break. On the contrary, when the radius of curvature exceeds 4 mm, the space efficiency is lowered.

In the structure comprising an electricity-generating element received in a closed battery case made of a resin sheet, it is preferably arranged that the electricity-generating element has lead terminals which linearly extend to the exterior of the battery case and the inner pressure in the sealed battery case is lower than ordinary atmospheric pressure, i.e., 760 mmHg. This is because the difference between the inner pressure and ordinary atmospheric pressure causes the electricity-generating element to be clamped, keeping the distance between the electrodes constant during charge-discharge cycle and hence minimizing the decrease of capacity with the increase of the number of cycles.

In order to inject the electrolytic solution into the battery case made of a resin sheet, it is preferred that a foam-preventive material made of an insulating net, unwoven cloth, felt or porous material be disposed along the winding axis of the electricity-generating element in contact with the electricity-generating element to receive the electricity-generating generating element in the battery case, followed by the injection of the electrolytic solution from the foam-preventive material side. In some detail, an electricity-generating element having an insulating foam-preventive material fixed thereto is received in a battery case which is open in two directions. The battery case is then welded and sealed at the opening where the foam-preventive material is not disposed. Thereafter, an electrolytic solution is injected into the battery case through the other opening where the foam-preventive material is disposed. Thereafter, the battery case is evacuated. The two opposing edges of the other opening are then welded to each other to seal the battery case. Since the electrolytic solution moves into the electricity-generating element while permeating into the foam-preventive material during the injection, the electrolytic solution can be prevented from hitting and bouncing off the electricity-generating element and hence can be prevented from being attached to the inner area of the battery case close to the opening. Further, since the upper end of the electricity-generating element is covered by the foam-preventive material, even when bubbles burst in the electrolytic solution during evacuation, no spray can be scattered out of the electricity-generating element, making it possible to prevent the electrolytic solution from being attached to the sealed portion and hence prevent the deterioration of the sealing properties.

Examples of the foregoing foam-preventive material include net, unwoven cloth, felt and porous material made of a polyolefin such as polypropylene and polyethylene. In order to fix the foam-preventive material to the electricity-generating element, a means such as heat fusion and bonding can be employed. As the adhesive there is preferably used an adhesive material which has heretofore been used in adhesive tapes. Examples of such an adhesive material include silicon-based adhesive, rubber-based adhesive, and acrylic adhesive.

BEST MODE FOR CARRYING OUT THE INVENTION

FIRST EMBODIMENT

Figure 1:
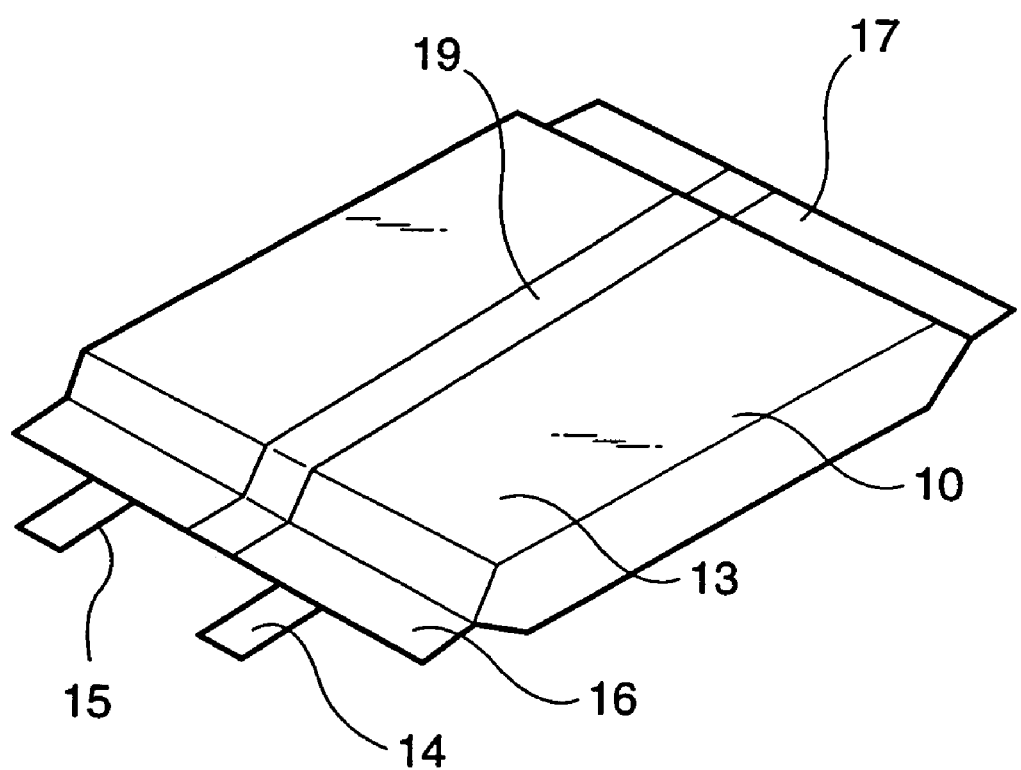
FIG. 1 is a perspective view of a nonaqueous secondary electrolytic battery according to the first embodiment of implication of the present invention.
Figure 2:
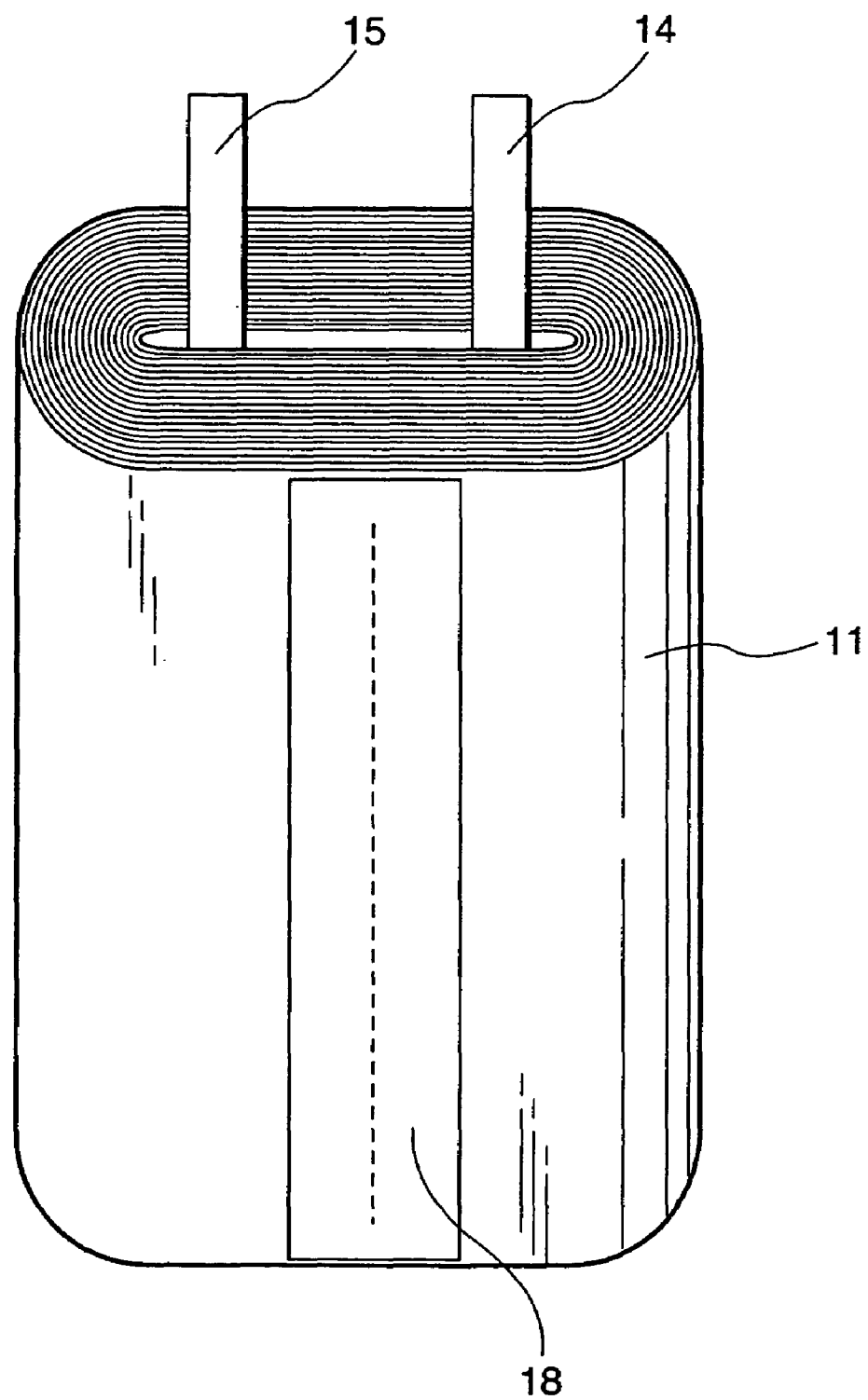
FIG. 2 is a perspective view of an electricity-generating element of the first embodiment.
Figure 3:
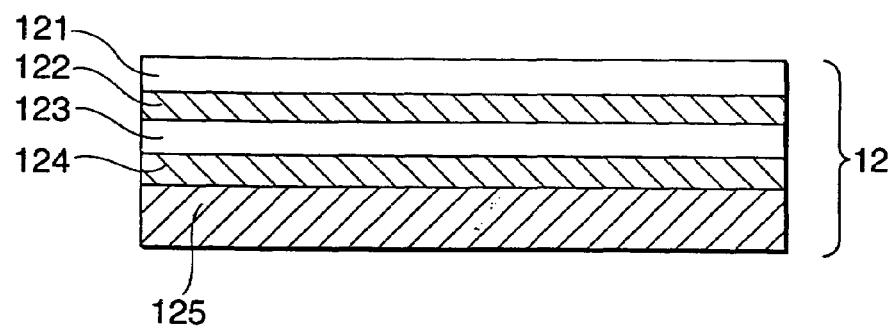
FIG. 3 is an enlarged sectional view of a resin sheet of the first embodiment.

The first embodiment of implication of the present invention will be described hereinafter in connection with FIGS. 1 to 3.

A nonaqueous secondary electrolytic battery 10 according to the present embodiment comprises an electrode body 11 (see FIG. 2) composed of a positive electrode plate, a negative electrode plate and a separating material (not shown) received in a battery case 13 made of a resin sheet 12 (see FIG. 3) together with a nonaqueous electrolytic solution (not shown). The reference numeral 14 indicates a positive electrode lead terminal, and the reference numeral 15 indicates a negative electrode lead terminal. The reference numeral 16 indicates a margin to weld on the end of the battery case where the drawing portion of the lead terminals 14 and 15 are disposed, and the reference numeral 17 indicates a margin to weld on the end of the battery case opposite the margin 16.

The resin sheet 12 is an aluminum-resin sheet. As shown in FIG. 3, the resin sheet 12 comprises a PET layer 121 having a thickness of 12 μm prepared by biaxial orientation process, an aluminum layer 122 having a thickness of 9 μm, a PET layer having a thickness of 12 μm prepared by biaxial orientation process, a PE (polyethylene) layer 124 having a thickness of 15 m, and a modified PE layer having a thickness of 50 μm in the descending order. The PET layer 121, PET layer 123, PE layer 124 and modified PE layer 125 are resin layers, and the aluminum layer 122 is a metal layer. Two sheets of the resin sheet 12 are welded to each other in such an arrangement that their modified PE layers 125 are opposed to each other to form a sealed bag-shaped battery case 13. The lamination of the oriented PET layers 121 and 123 which are disposed above and under the aluminum layer 122, respectively, with the aluminum layer 122 is carried out by dry lamination process.

The positive electrode plate comprises a lithium-cobalt composite oxide retained as an active material on a collector. As the collector there was used an aluminum foil having a thickness of 20 μm. The positive electrode plate was prepared by a process which comprises mixing 8 parts of a polyvinylidene fluoride as a binder and 5 parts of acetylene black as an electrically-conducting agent with 87 parts of an active material, adding properly N-methylpyrrolidone to the mixture, pasting the mixture to form a positive electrode compound, applying the positive electrode compound to both surfaces of the collector material, and then drying the coated material.

As the collector for negative electrode plate there was used a coil foil having a thickness of 14 μm. The negative electrode plate was prepared by a process which comprises mixing 86 parts of graphite as an active material and 14 parts of a polyvinylidene fluoride as a binder, pasting the mixture to form a negative electrode compound, applying the negative electrode compound to both surfaces of the collector, and then drying the coated material.

The separator as separating material is a polyethylene porous membrane. The electrolytic solution is a 1:1 (by volume) mixture of ethylene carbonate and diethyl carbonate containing 1 mol/l of $LiPF_6$.

Referring to the size of the various members, the thickness and width of the positive electrode plate are 180 μm and 62 mm, respectively, the thickness and width of the separator are 25 μm and 67 mm, respectively, and the thickness and width of the negative electrode plate are 170 μm and 64 mm, respectively.

Subsequently, a rectangular aluminum lead terminal was each welded to the positive electrode plate and negative electrode plate. A polyimide resin tape was then stuck to the welded portion with an urethane-based adhesive resistant to electrolytic solution to reinforce the battery case. Subsequently, the positive electrode, the separator, the negative electrode and the separator were laminated in this order. The laminate was then wound on the rectangular polyethylene core in such an arrangement that the longer side of the rectangle is parallel to the winding axis of the electricity-generating element to form a noncircular electricity-generating element. A fixing tape 18 made of a polyimide was then stuck to the electricity-generating element wall parallel to the winding axis at the tail end of the electrode to a length corresponding to the width of the electrode (length of the electrode parallel to the winding axis) to fix the winding of the electricity-generating element. (See FIG. 2)

Subsequently, the electricity-generating element 11 was placed on the central portion of a flat resin sheet 12. The resin sheet 13 was wound from the both ends thereof in such an arrangement that the electricity-generating element 11 was wrapped. The ends of the resin sheet 13 were brought into contact with each other in such an arrangement that their modified PE layers were opposed to each other, and then compressed while being heated by a heating plate so that they were heat-fused to each other. (The resulting welded portion is a margin 19 to weld.) The resin sheet was then heat-fused at the side thereof where the lead terminals 14 and 15 were not present. Subsequently, an electrolytic solution was vacuum-injected into the battery case in an amount such that the various electrodes and the separator can be thoroughly wet and there can be present no free electrolytic solution outside the group of electrodes. Subsequently, the resin sheet 13 was similarly heat-fused on the side thereof where the lead terminals 14 and 15 are provided. As a result, a battery case 13 welded at only three positions was formed.

10 samples of battery 1A according to the invention having a designed capacity of 800 mAh, a length of 80 mm, a width of 35 mm and a thickness of 4 mm were prepared in accordance with the foregoing constitution and procedure. Further, 10 samples of each of batteries 1B, 1C and 1D according to the invention having a designed capacity of 800 mAh, a length of 80 mm, a width of 35 mm and a thickness of 4 mm were prepared in accordance with the same constitution and procedure as mentioned above except that the structure of the resin sheet 12 constituting the battery case 13 was as follows. In other words, the resin sheet 12 of the battery 1B comprises a PET layer having a thickness of 12 μm prepared by biaxial orientation process, an aluminum layer having a thickness of 9 μm, a PP layer (oriented polypropylene) having a thickness of 15 µm prepared by orientation process, and a modified PP layer having a thickness of 50 µm in the descending order. In this structure, the modified PP layers are welded to each other to form a battery case 13.

The resin sheet 12 of the battery 1C comprises a PET layer having a thickness of 12 µm prepared by biaxial orientation process, an aluminum layer having a thickness of 9 µm, a nylon layer having a thickness of 12 µm prepared by orientation process (oriented nylon), and a modified PP layer having a thickness of 50 µm in the descending order.

The resin sheet 12 of the battery 1D comprises a nylon layer having a thickness of 12 µm prepared by orientation process (oriented nylon), an aluminum layer having a thickness of 9 µm, a PET layer having a thickness of 12 µm prepared by orientation process, and a modified PP layer having a thickness of 50 µm in the descending order.

Further, 10 samples of comparative battery R1 having a designed capacity of 800 mAh, a length of 80 mm, a width of 35 mm and a thickness of 4 mm were prepared in the same constitution and procedure as battery 1A except that the structure of the resin sheet 12 constituting the battery case 13 was as follows. In other words, the resin sheet 12 of the battery R1 comprises a PET layer having a thickness of 12 µm prepared by biaxial orientation process, an aluminum layer having a thickness of 9 µm, and a modified PE layer having a thickness of 70 µm in the descending order.

The various resin sheets (20 mm wide×50 mm long) used to prepare the battery case 13 of these batteries 1A to 1D and R1 were each repeatedly bent longitudinally at an angle of 180 degrees at the center thereof and then extended (this movement constitutes one cycle). Thus, the number of cycles at which the aluminum layer undergoes cracking was examined. The results are set forth in Table 1.

TABLE 1

| Battery | Structure of resin sheet | Number of bending cycles at which cracking occurs |
|---|---|---|
| 1A | Biaxially oriented PET/Al/biaxially oriented PET/PE/modified PE | 10 |
| 1B | Biaxially oriented PET/Al/oriented PP/modified PP | 8 |
| 1C | Biaxially oriented PET/Al/oriented Ny/modified PE | 11 |
| 1D | Oriented Ny/Al/oriented PP/modified PE | 9 |
| R1 | Biaxially oriented PET/Al/modified PE | 1 |

Table 1 shows that the resin sheet of the comparative battery R1 underwent cracking at the first bending cycle. On the other hand, it was shown that the resin sheet of the batteries 1A, 1B, 1C and 1D, which comprises an oriented resin layer provided above and under an aluminum layer as a metal layer, can undergo cracking far more difficultly than the resin sheet of the comparative battery R1.

10 samples of each of the batteries 1A to 1D and R1 were subjected to constant-current and constant-voltage charging at 800 mA, 4.1 V and 3 h to the full. The margin 17 to weld was then bent toward the terminal side so that it was double-folded. The batteries thus processed were then allowed to stand at a temperature of 60° C. and 90% RH for 30 days. The batteries were then examined for corrosion of aluminum at the folded portion (visual observation), vertical swelling of battery and leakage of electrolytic solution. The results are set forth in Table 2.

TABLE 2

| Battery | Corrosion of aluminum | Battery swelling (vertical) | Leakage of electrolytic solution |
|---|---|---|---|
| 1A | 0/10 samples | 0.1 mm to 0.2 mm | 0/10 samples |
| 1B | 0/10 samples | 0.1 mm to 0.2 mm | 0/10 samples |
| 1C | 0/10 samples | 0.1 mm to 0.2 mm | 0/10 samples |
| 1D | 0/10 samples | 0.1 mm to 0.2 mm | 0/10 samples |
| R1 | 6/10 samples | 0.3 mm to 1.5 mm | 3/10 samples |

Table 2 shows that the batteries 1A to 1D of the invention showed no corrosion of aluminum and leakage of electrolytic solution and underwent little swelling as compared with the comparative battery R1.

The oriented resin sheet is not limited to that used in the present embodiment.

In accordance with the present invention, a nonaqueous secondary electrolytic battery can be provided comprising a battery base formed by a resin sheet made of a metal and a resin which can be produced free from defectives at the production step and can be easily assembled.

SECOND EMBODIMENT

Figure 4:
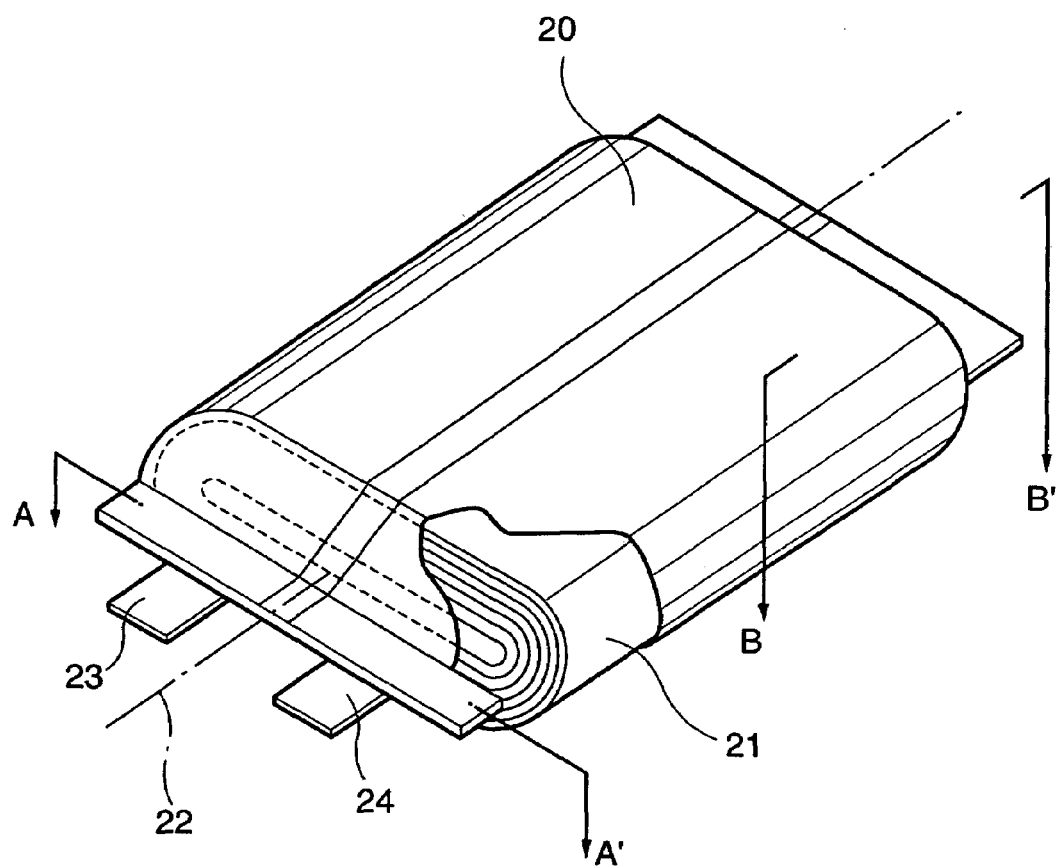
FIG. 4 is a perspective view of a nonaqueous secondary electrolytic battery according to the second embodiment of implication of the present invention.

The nonaqueous secondary electrolytic battery according to the present embodiment comprises an ellipsoidally wound electricity-generating element composed of a positive electrode plate, a separating material and a negative electrode plate received in a bag-shaped battery case formed by heat-fusing a metal-laminated resin film together with a nonaqueous electrolytic solution (not shown). The external appearance of this nonaqueous secondary electrolytic battery is shown in FIG. 4. The reference numeral 20 indicates a bag-shaped battery case, and the reference numeral 21 indicates an electricity generating element comprising a positive electrode plate and a negative electrode plate ellipsoidally wound with a polyethylene microporous membrane as a separating material (separator). The reference numeral 22 indicates the winding axis of the electricity-generating element, the reference numeral 23 indicates a positive electrode lead terminal connected to the positive electrode plate, and the reference numeral 24 indicates a negative electrode lead terminal connected to the negative electrode plate.

As the active positive electrode material there was used a lithium-cobalt composite oxide. The positive electrode plate comprises the foregoing lithium-cobalt composite oxide retained on an aluminum foil collector having a thickness of 20 µm as an active material. The positive electrode plate was prepared by a process which comprises mixing 6 parts of a polyvinylidene fluoride as a binder and 3 parts of acetylene black as an electrically-conducting agent with 91 parts of an active material, properly adding N-methylpyrrolidone to the mixture, pasting the mixture to prepare a positive electrode compound, applying the positive electrode compound to both surfaces of the collector, and then drying the coated material.

The negative electrode plate was prepared by a process which comprises mixing 92 parts of graphite as a host material and 8 parts of a polyvinylidene fluoride as a binder, properly adding N-methylpyrrolidone to the mixture, pasting the mixture to prepare a negative electrode compound, applying the negative electrode compound to a copper foil collector having a thickness of 141 µm, and then drying the coated material. As the electrolytic solution there was used a 3:7 (by volume) mixture of ethylene carbonate and diethyl carbonate containing 1 mol/l of $LiPF_6$.

Referring to the size of the electrode plates, the positive electrode plate has a thickness of 185 μm and a width of 42 mm, the separator has a thickness of 25 μm and a width of 45 mm, and the negative electrode plate has a thickness of 160 μm and a width of 43.5 mm. Lead terminals 23 and 24 were welded to the positive electrode plate and negative electrode plate, respectively. The positive electrode plate, the separator and the negative electrode plate were laminated in this order, and then ellipsoidally wound on a rectangular polyethylene core in such an arrangement that the long side of the rectangle is parallel to the winding axis 22 to prepare an electricity-generating element having a size of 48 mm×27.3 mm×3.23 mm.

Subsequently, a fixing tape made of a polypropylene which is not shown (adhesive coated on one surface thereof) was stuck to the wall portion of the electricity-generated element 21 parallel to the winding axis 22 at the insulating portion of the electrode plate to a length corresponding to the width of the electrode (length of the electricity-generating element 21 parallel to the winding axis of the electricity-generating element) to fix the winding of the electricity-generating element 21.

The electricity-generating element thus formed was then received in a cylindrical battery case 20 formed by a metal-laminated resin film which is open in two directions in such an arrangement that the winding axis 22 of the electricity-generating element 21 was perpendicular to the plane of the opening. The two opposing edges of the opening where the lead terminals 23 and 24 were disposed were welded to each other with the lead terminals 23 and 24 put therein to seal the battery case. Subsequently, an electrolytic solution was vacuum-injected into the battery case through the other opening in an amount such that the various electrodes and the separator can be thoroughly wet and there can be present no free electrolytic solution outside the electricity-generating element. Thereafter, the two opposing edges of the other opening were welded to each other to seal the battery case 20.

Figure 5:
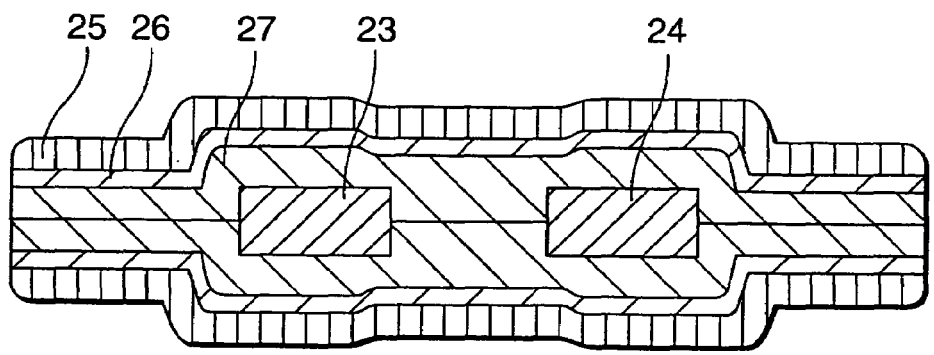
FIG. 5 is an enlarged sectional view of the welded portion of lead electrode drawing portion taken along the line A-A' of FIG. 4.

FIG. 5 illustrates a section (taken along the line A-A' of FIG. 4) of the welded portion of the drawing portion of the lead terminals of the battery shown in FIG. 4. In the drawing, the reference numeral 25 indicates a surface protective layer (PET film having a thickness of 12 μm) for resin sheet constituting the battery case 20, the reference numeral 26 indicates a metal barrier layer (aluminum foil having a thickness of 9 μm), and the reference numeral 27 indicates a heat-fused layer (acid-modified low density polyethylene layer 13 having a thickness of 150 μm). The surface protective PET film 25 as the outermost layer and the aluminum foil 26 as a barrier layer are bonded to each other with an urethane-based adhesive.

The positive electrode lead terminal 23 and the negative electrode lead terminal 24 are made of a metal conductor such as copper, aluminum and nickel having a thickness of from 50 μm to 100 μm.

Figure 6:
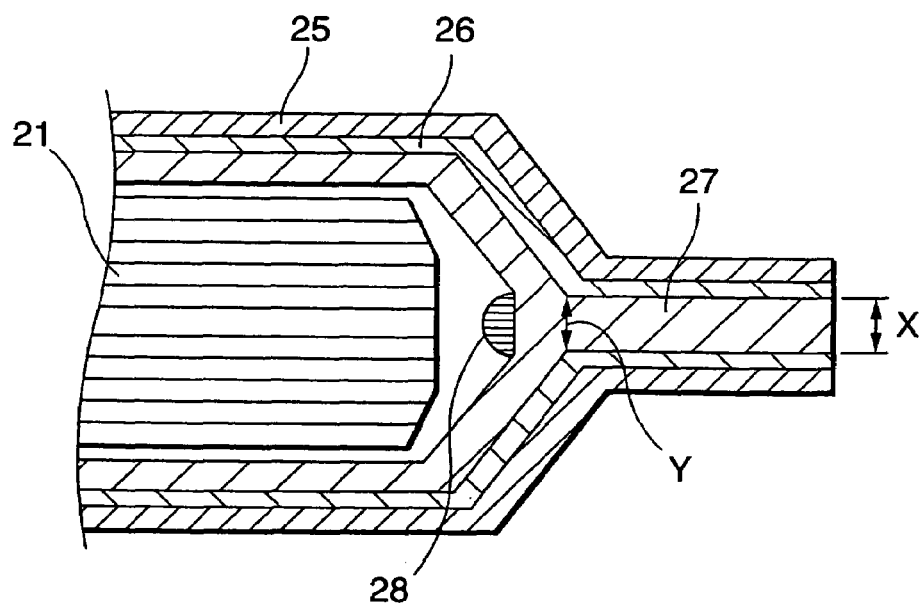
FIG. 6 is an enlarged sectional view of the welded portion taken along the line B-B' of FIG. 4.

In order to weld the resin sheet constituting the battery case 20, two resin sheets are superimposed on each other in such an arrangement that their heat-fused layers 27 are opposed to each other. The resin sheets are then heat-fused to each other at a temperature of 250° C. The heat-fused portion is then pressed to a thickness of 250 μm. In this manner, the molten resin is pressed out of the inner end of the welded portion of the battery case 20 to seal the battery case while forming a resin mass 28. By thus heat-fusing the resin sheet in such a manner that the molten and solidified resin mass 28 is formed protruding from the inner end of the welded portion toward the inner space of the battery case 20, and predetermining that the thickness X of the outer end of the welded portion is equal to the thickness Y of the inner end of the welded portion, a battery 2A was prepared (see FIG. 6). The nominal capacity of the battery A is 420 mAh.

Figure 7:
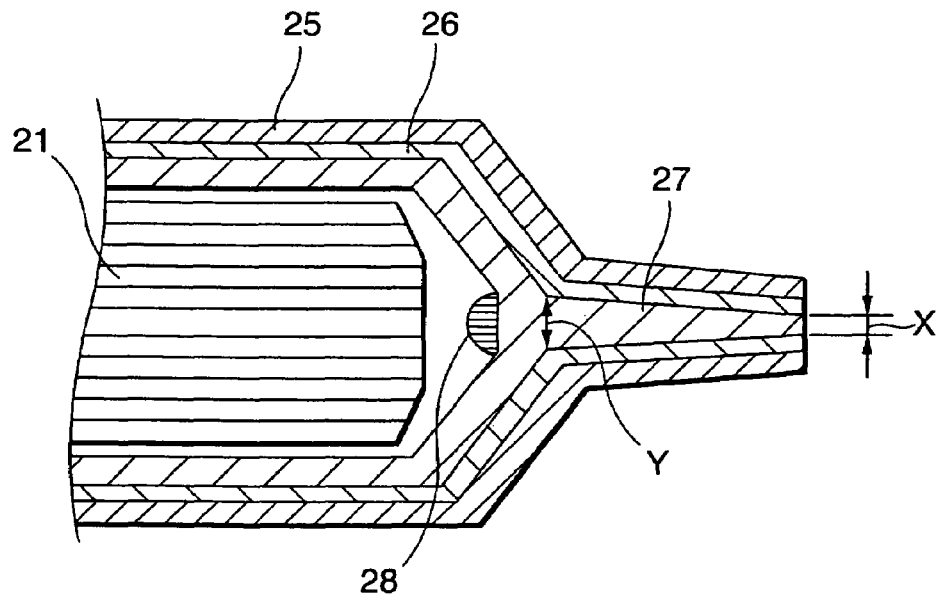
FIG. 7 is an enlarged sectional view of the welded portion showing a battery of the type different from that of the second embodiment of FIG. 6.

Further, by heat-fusing the resin sheet in such a manner that the molten and solidified resin mass 28 is formed protruding toward the inner space of the battery case 20 in the same manner as mentioned above, and predetermining that the thickness X of the outer end of the welded portion is smaller than the thickness Y of the inner end of the welded portion, a battery 2B was prepared (see FIG. 7). In order to make the thickness of the two ends of the welded portion different, the resin sheet is heat-fused using a press having a slope. In the case of the battery B, the thickness X of the outer end is 100 μm, the thickness Y of the inner end is 250 μm, and the nominal capacity is 420 mAh similarly to the battery A.

Further, a battery R2 was prepared as a comparative example. This battery was prepared in the same manner as the foregoing batteries 2A and 2B except that the resin sheet was heat-fused at the welded portion of the battery case 20 in such a manner that no resin mass 28 was formed protruding toward the inner space of the battery case 20 and the thickness X of the outer end of the welded portion was equal to the thickness Y of the inner end of the welded portion.

The results of measurement of the batteries 2A, 2B and R2 for pressure resistance are set forth in Table 3. For the measurement of pressure resistance, hydraulic pressure was applied to the interior of the battery case 20. The hydraulic pressure at which the welded portion undergoes peeling was measured.

TABLE 3

|  | Is resin mass 28 present in the battery? | Pressure at which the welded portion opens |
| --- | --- | --- |
| Battery R2 | No | 15 atm. |
| Battery 2A | Yes | 28 atm. |
| Battery 2B | Yes | 28 atm. |

The batteries 2A and 2B, which comprised a resin mass 28 provided at the inner end of the welded portion of the battery case 20, required pressure as great as about twice the battery R2, which comprised no resin mass, for the welded portion to open. This is presumably because stress is scattered to both ends of a curved resin mass 28 present at the inner end of the bond interface without being applied directly to the bond interface in the batteries 2A and 2B while stress is applied only to the bond interface of the welded portion. As a result, the pressure resistance of the battery case is enhanced.

As can be seen in the foregoing results, the pressure resistance of the battery case 20 can be remarkably enhanced by forming a resin mass 28 at the inner end of the welded portion of the battery case 20. Further, a nonaqueous secondary electrolytic battery can be provided which doesn't undergo peeling at the welded portion of the battery case 20 and thus exhibits an excellent airtightness even when the inner pressure thereof arises due to heat developed by overcharging or internal shortcircuiting or storage at high temperature.

The resin mass protruding from the inner end of the welded portion toward the inner space of the battery case exerts its effect even if its size is considerably small. It exerted a sufficient effect so far as it protrudes from the portion at which the resin and the inner surface of the battery case are welded to each other or the resin and the lead terminals are welded to each other by 0.1 mm or more.

In order to confirm the effect of the difference between the thickness X of the outer end of the welded portion and the thickness Y of the inner end of the welded portion, the following batteries 2C to 2G were prepared.

The batteries 2C to 2G have the same sectional structure of welded portion of battery case 20 as shown in FIG. 7 and have a thickness Y of 250 μm at the inner end of the welded portion and a thickness X of 245 μm, 240 μm, 200 μm, 150 μm, and 50 μm, respectively, at the outer end of the welded portion to have a difference (=Y−X) of 5 μm, 10 μm, 50 μm, 100 μm, and 200 μm, respectively, between the thickness Y at the inner end of the welded portion and the thickness X at the outer end of the welded portion.

The batteries 2C to 2G and the previously mentioned battery 2A were subjected to constant current-constant voltage charging at 400 mA and 4.1 V for 4 hours to the full, and then allowed to stand at a temperature of 60° C. for 1 month. The capacity of the battery which had been allowed to stand was then compared with that of the battery which had not yet been allowed to stand. The increase in water content and the evaporation loss of the electrolytic solution in the battery which had thus been allowed to stand were measured. The results of 60° C.-1 month aging test are set forth in Table 4.

TABLE 4

|  | Difference of thickness | Increase of water content | Evaporation loss of electrolytic solution | % Retention of capacity |
|---|---|---|---|---|
| Battery 2A | 0 μm | 310 ppm | 21 mg | 82.0 |
| Battery 2C | 5 μm | 57 ppm | 7 mg | 85.2 |
| Battery 2D | 10 μm | 34 ppm | 5 mg | 90.3 |
| Battery 2E | 50 μm | 30 ppm | 5 mg | 92.2 |
| Battery 2F | 100 μm | 23 ppm | 4 mg | 93.5 |
| Battery 2G | 200 μm | 20 ppm | 3 mg | 94.0 |

The results of these tests show that the smaller the thickness X of the outer end of the welded portion is as compared with the thickness Y of the inner end of the welded portion, the more can be inhibited the entrance of water content into the battery and the evaporation of electrolytic solution to the exterior of the battery and the more can be improved the storage properties of the battery. This is because the welded portion of the resin sheet is free of a metal portion 26 as a barrier layer which prevents the entrance of water content into the battery case and the evaporation of electrolytic solution to the exterior of the battery and thus easily causes the entrance of water content into the battery and the evaporation of electrolytic solution to the exterior of the battery through the heat-fused layer.

Further, when water content enters into the interior of the battery, it reacts with $LiPF_6$ in the electrolytic solution to produce HF which then corrodes aluminum constituting the positive electrode collector to raise the internal resistance of the battery or reacts with the electrolytic solution on the surface of the electrode to form a film, causing the drop of battery capacity. Thus, by making the thickness of the tip of the welded portion smaller than that of the root of the welded portion, the contact area of the welded portion with the atmosphere can be reduced and the passage through which water content and electrolytic solution pass can be shortened, making it possible to prevent the entrance of water content into the interior of the battery and the evaporation of electrolytic solution to the exterior of the battery and hence prevent the deterioration of the battery properties. Accordingly, prolonged storage of batteries was made possible.

THIRD EMBODIMENT

The present embodiment differs from the foregoing second embodiment only in the electrolytic solution and the structure of welded portion. The other structures of the present embodiment are the same as that of the second embodiment shown in FIGS. 4 to 6. As batteries of the third embodiment there were prepared the following six batteries 3A to 3F. As the electrolytic solution there was used a 3:8 (by volume) mixture of ethylene carbonate and diethyl carbonate containing 1.2 mol/l of $LiPF_6$ for each of these batteries.

[Battery 3A]

Figure 8:
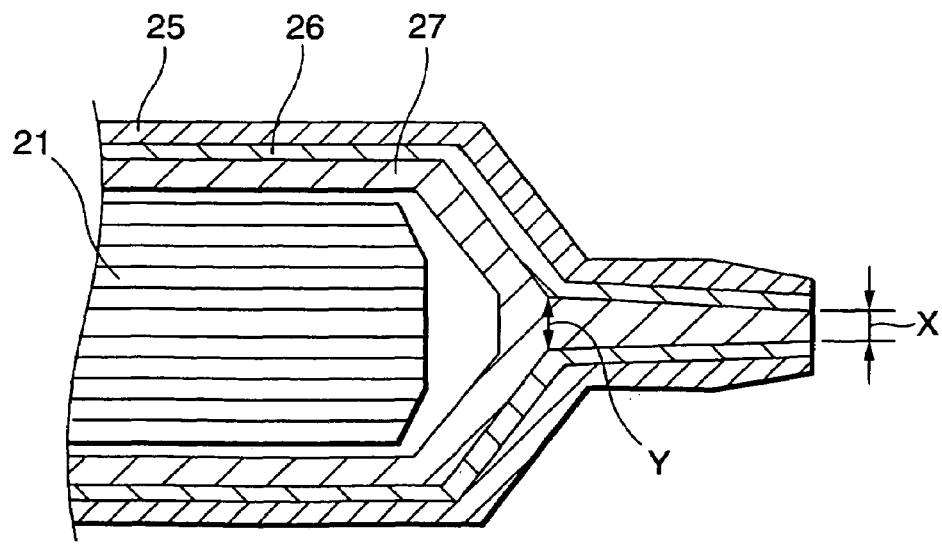
FIG. 8 is an enlarged sectional view of the welded portion of a nonaqueous secondary electrolytic battery according to the third embodiment of implication of the present invention.

The structure of the welded portion is as shown in FIG. 8. The thickness Y of the inner end of the welded portion is 300 μm, and the thickness X of the outer end of the welded portion is 250 μm.

[Battery 3B]

The structure of the welded portion is as shown in FIG. 8. The thickness Y of the inner end of the welded portion is 300 μm, and the thickness X of the outer end of the welded portion is 200 μm.

[Battery 3C]

The structure of the welded portion is as shown in FIG. 8. The thickness Y of the inner end of the welded portion is 300 μm, and the thickness X of the outer end of the welded portion is 150 μm.

[Battery 3D]

The structure of the welded portion is as shown in FIG. 8. The thickness Y of the inner end of the welded portion is 300 μm, and the thickness X of the outer end of the welded portion is 100 μm.

[Battery 3E]

The structure of the welded portion is as shown in FIG. 8. The thickness Y of the inner end of the welded portion is 300 μm, and the thickness X of the outer end of the welded portion is 75 μm.

[Battery 3F]

The structure of the welded portion is as shown in FIG. 8. The thickness Y of the inner end of the welded portion is 300 μm, and the thickness X of the outer end of the welded portion is 50 μm.

[Battery 3G]

Figure 9:
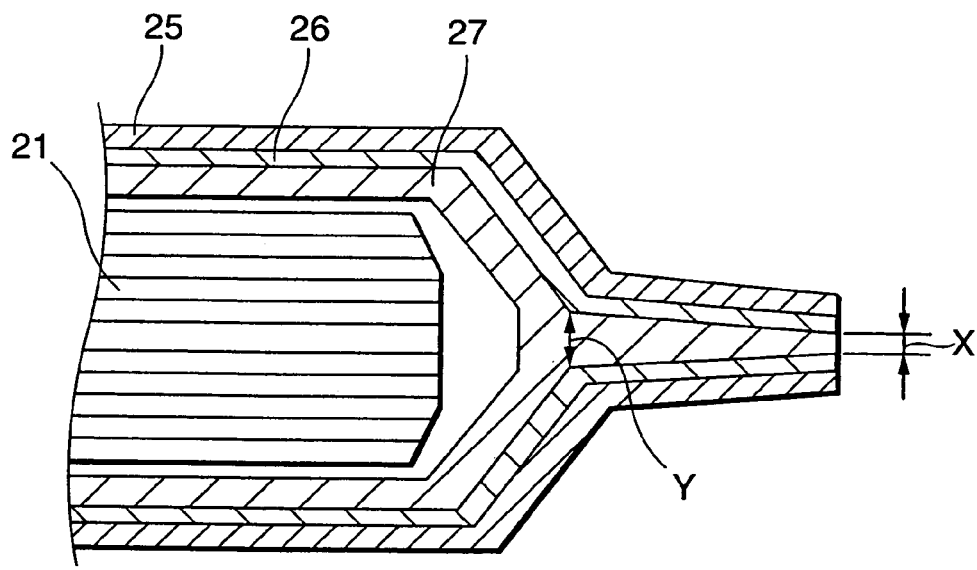
FIG. 9 is an enlarged sectional view of the welded portion of another type of a battery of the third embodiment of the present invention.

The structure of the welded portion is as shown in FIG. 9. The thickness Y of the inner end of the welded portion is 300 μm, and the thickness X of the outer end of the welded portion is 250 μm.

[Battery 3H]

The structure of the welded portion is as shown in FIG. 9. The thickness Y of the inner end of the welded portion is 300 μm, and the thickness X of the outer end of the welded portion is 200 μm.

[Battery 3I]

The structure of the welded portion is as shown in FIG. 9. The thickness Y of the inner end of the welded portion is 300 μm, and the thickness X of the outer end of the welded portion is 150 μm.

[Battery 3J]

The structure of the welded portion is as shown in FIG. 9. The thickness Y of the inner end of the welded portion is 300 µm, and the thickness X of the outer end of the welded portion is 100 µm.

[Battery 3K]

The structure of the welded portion is as shown in FIG. 9. The thickness Y of the inner end of the welded portion is 300 µm, and the thickness X of the outer end of the welded portion is 75 µm.

[Battery 3L]

The structure of the welded portion is as shown in FIG. 9. The thickness Y of the inner end of the welded portion is 300 µm, and the thickness X of the outer end of the welded portion is 50 µm.

[Comparative Battery R3]

The same resin sheet as used in the batteries 3A to 3F in the foregoing embodiments were used. However, the structure of the welded portion is arranged such that the thickness Y of the inner end of the welded portion is equal to the thickness X of the outer end of the welded portion, i.e., 300 µm.

[Comparative Battery R4]

The same resin sheet as used in the batteries 3A to 3F in the foregoing embodiments were used. However, the structure of the welded portion is arranged such that the thickness Y of the inner end of the welded portion is equal to the thickness X of the outer end of the welded portion, i.e., 250 µm.

[Comparative Battery R5]

The same resin sheet as used in the batteries 3A to 3F in the foregoing embodiments were used. However, the structure of the welded portion is arranged such that the thickness Y of the inner end of the welded portion is equal to the thickness X of the outer end of the welded portion, i.e., 200 µm.

[Comparative Battery R6]

The same resin sheet as used in the batteries 3A to 3F in the foregoing embodiments were used. However, the structure of the welded portion is arranged such that the thickness Y of the inner end of the welded portion is equal to the thickness X of the outer end of the welded portion, i.e., 150 µm.

[Comparative Battery R7]

The same resin sheet as used in the batteries 3A to 3F in the foregoing embodiments were used. However, the structure of the welded portion is arranged such that the thickness Y of the inner end of the welded portion is equal to the thickness X of the outer end of the welded portion, i.e., 100 µm.

[Comparative Battery R8]

The same resin sheet as used in the batteries 3A to 3F in the foregoing embodiments were used. However, the structure of the welded portion is arranged such that the thickness Y of the inner end of the welded portion is equal to the thickness X of the outer end of the welded portion, i.e., 75 µm.

[Comparative Battery R9]

The same resin sheet as used in the batteries 3A to 3F in the foregoing embodiments were used. However, the structure of the welded portion is arranged such that the thickness Y of the inner end of the welded portion is equal to the thickness X of the outer end of the welded portion, i.e., 50 µm.

Table 5 shows the properties of the comparative 420 mAh batteries R3 to R9, i.e., thickness of inner end, occurrence of wrinkle on the side face of battery case, breakage of aluminum layer at wrinkled area, and occurrence of leakage of electrolytic solution.

TABLE 5

| Comparative battery | Thickness of welded (µm) | Wrinkled on the side face of battery case? | Aluminum layer broken? | Electrolytic solution leaked? |
|---|---|---|---|---|
| R3 | 300 | No | No | No |
| R4 | 250 | Yes | Yes | Yes |
| R5 | 200 | Yes | Yes | Yes |
| R6 | 150 | Yes | Yes | Yes |
| R7 | 100 | Yes | Yes | Yes |
| R8 | 75 | Yes | Yes | Yes |
| R9 | 50 | Yes | Yes | Yes |

Table 6 shows the ratio of 1 CmA discharge capacity of the comparative batteries R3 to R9 and the batteries 3A to 3L of the foregoing embodiments which have been charged at 1 CmA/4.2 V for 3 hours, and then allowed to stand at 25° C. for one year to the initial value of 1 CmA discharge capacity.

TABLE 6

| thickness of outer end of welded portion (µm) | Battery | % Discharge capacity ratio | Battery | % Discharge capacity ratio | Battery | % Discharge capacity ratio |
|---|---|---|---|---|---|---|
| 300 | R3 | 60.0 | — | — | — | — |
| 250 | R4 | 47.2 | 3A | 83.4 | 3G | 84.2 |
| 200 | R5 | 45.3 | 3B | 85.5 | 3H | 85.1 |
| 150 | R6 | 43.3 | 3C | 92.2 | 3I | 92.4 |
| 100 | R7 | 43.2 | 3D | 92.3 | 3J | 92.9 |
| 75 | R8 | 43.1 | 3E | 92.4 | 3K | 92.9 |
| 50 | R9 | 40.5 | 3F | 93.5 | 3L | 93.6 |

As can be seen in Table 5, all the comparative batteries having a welded portion thickness of 250 µm or less showed leakage of electrolytic solution. As a result, the batteries were observed wrinkled on the side face of battery case and broken in the aluminum layer in the metal-laminated resin sheet. It is thus thought that the entrance of water content into the position of the electricity-generating element through the sealed portion and the evaporation of electrolytic solution cause a drastic deterioration of long-term storage properties of battery. It is also thought that the batteries having a welded portion thickness of 300 µm was not observed wrinkled but showed a deterioration of long-term storage properties due to the entrance of water content and evaporation of electrolytic solution.

On the other hand, the batteries 3A to 3L according to the foregoing embodiments showed a high discharge ratio and hence a drastic improvement in long-term, storage properties. This is presumably because the thickness of the inner end of the welded portion is secured, preventing the aluminum layer from breaking due to wrinkle on the side face of the case. It is also thought that since the thickness of the outer end of the welded portion is small, the contact area of the outer end of the welded portion with the atmosphere is reduced, making it possible to inhibit the entrance of water content into the battery and the evaporation of electrolytic solution.

Further, the comparison of the group of batteries 3A to 3F with the group of batteries 3G to 3L, which have the same thickness of the outer end of welded portion as that of the group of batteries 3A to 3F but have different shapes of outer surface, gives suggestion that the storage properties (discharge capacity ratio) of battery are not related to the shape of the outer surface of the welded portion but related only to the contact area of the surface of the outer end of the welded portion with the atmosphere. Accordingly, it is thought that the shape of the outer surface of the welded portion may be arbitrary so far as the thickness of the outer end of the welded portion is smaller than the thickness of the inner end of the welded portion.

The difference between the thickness of the outer end of the welded portion and the thickness of the inner end of the welded portion is not specifically limited herein. However, even more desirable storage properties can be obtained when the difference between the thickness of the outer end and the thickness of the inner end is 50 µm or more.

FOURTH EMBODIMENT

The fourth embodiment of implication of the present invention will be described in connection with FIGS. 10 to 14.

Figure 10:
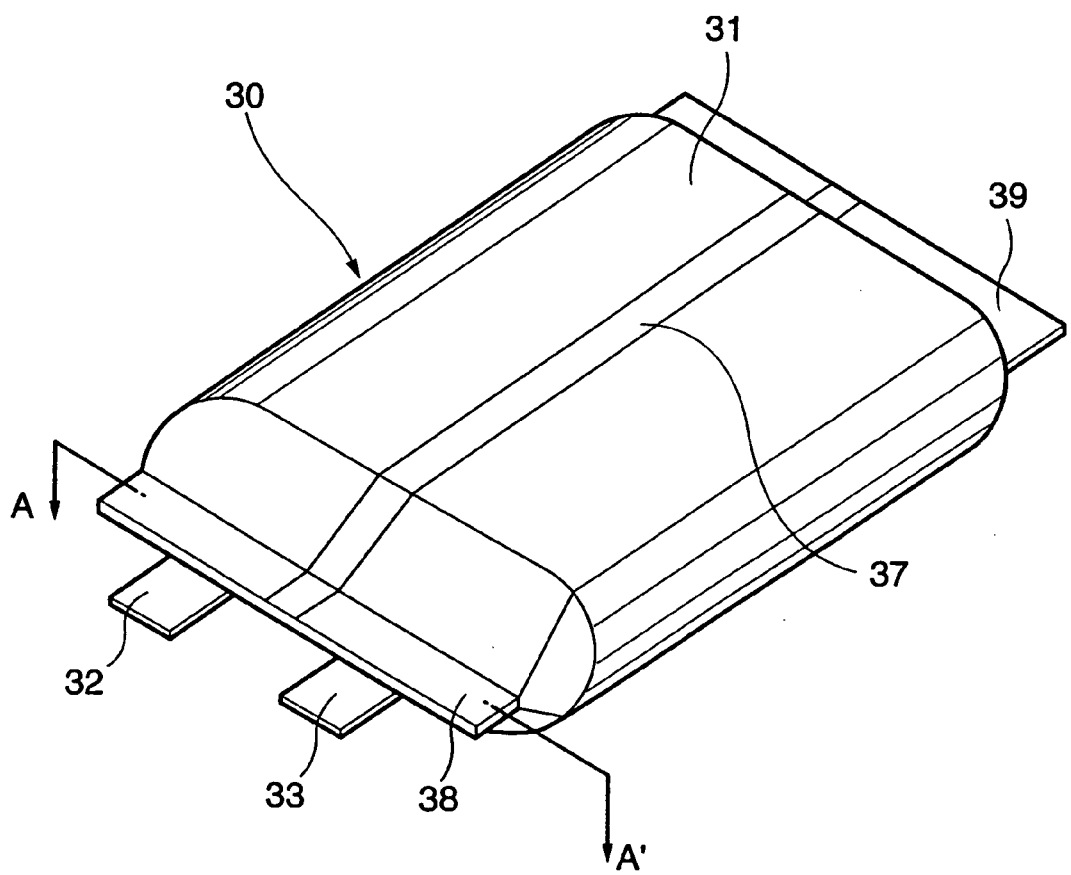
FIG. 10 is a perspective view of a nonaqueous secondary electrolytic battery according to the fourth embodiment of implication of the present invention.

The nonaqueous secondary electrolytic battery according to the present embodiment comprises an ellipsoidally wound electricity-generating element 30 composed of a positive electrode plate, a separating material and a negative electrode plate received in a bag-shaped battery case 31 formed by heat-fusing a metal-laminated resin sheet together with a nonaqueous electrolytic solution (not shown). The external appearance of the battery case 31 which has been sealed is shown in FIG. 10.

Figure 11:
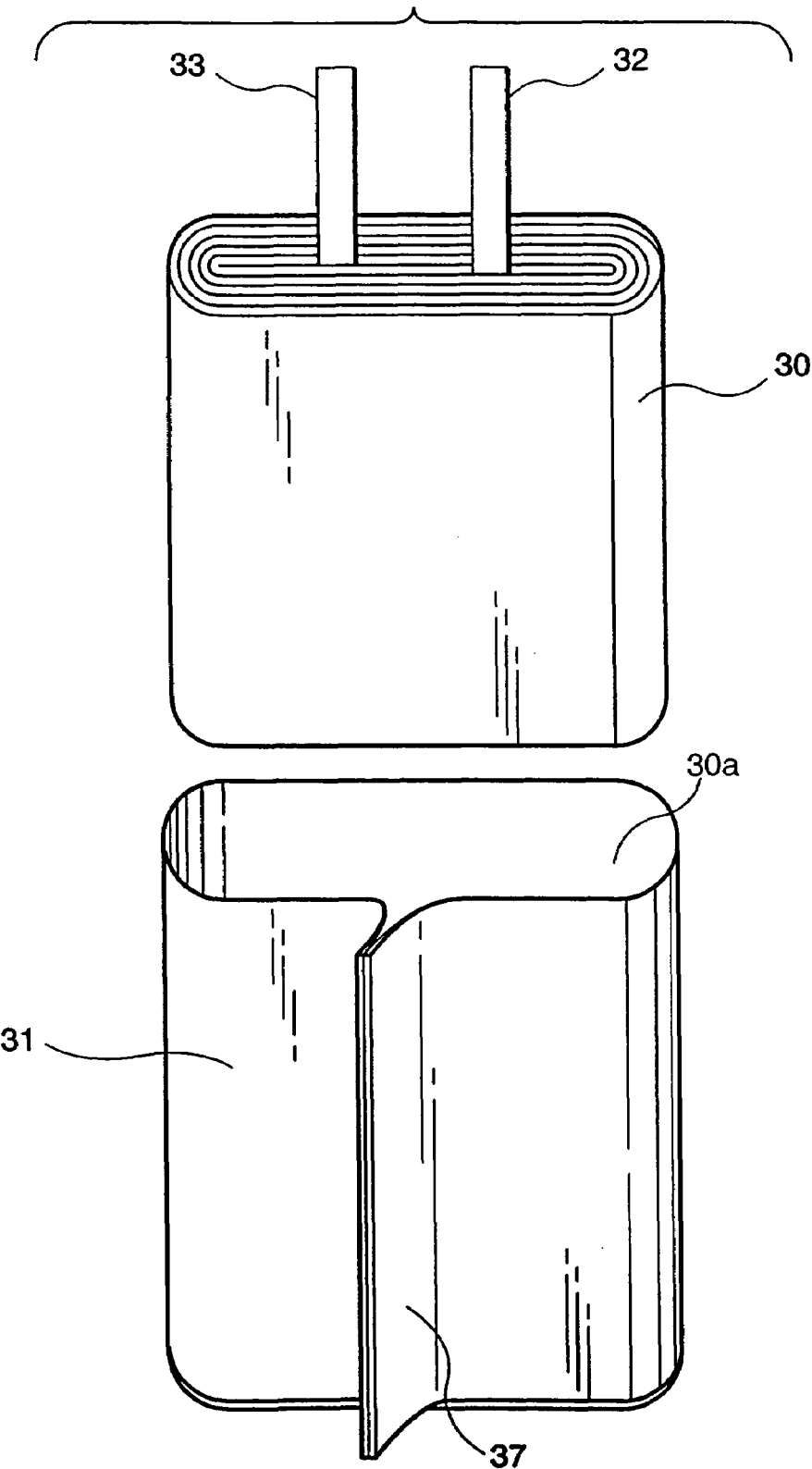
FIG. 11 is a perspective view of a battery case having no electricity-generating element received therein.

The electricity-generating element 30 is prepared by winding a positive electrode plate and a negative electrode plate with a polyethylene microporous membrane as a separating material (separator) in the form of ellipsoid as shown in FIG. 11. The reference numeral 32 indicates a positive electrode lead terminal connected to the positive electrode plate, and the reference numeral 33 indicates a negative electrode lead terminal connected to the negative electrode plate made of a metal conductor such as copper, aluminum and nickel having a thickness of from 50 µm to 100 µm.

The structure of the positive electrode plate and negative electrode plate is the same as that of the foregoing second embodiment. The electrolytic solution thus used is a 4:6 (by volume) mixture of ethylene carbonate and diethyl carbonate containing 1 mol/l of $LiPF_6$. Referring to the size of the electrode plates, the positive electrode plate has a thickness of 180 µm and a width of 51 mm, the separator has a thickness of 25 µl and a width of 53 mm, and the negative electrode plate has a thickness of 170 µm and a width of 51 mm. Lead terminals 32 and 33 were welded to the positive electrode plate and negative electrode plate, respectively. The positive electrode plate, the separator and the negative electrode plate were laminated in this order, and then ellipsoidally wound on a rectangular polyethylene core in such an arrangement that the long side of the rectangle is parallel to the winding axis of the electricity-generating element 30 to prepare an electricity-generating element having a size of 53 mm×35 mm×4 mm.

Figure 14:
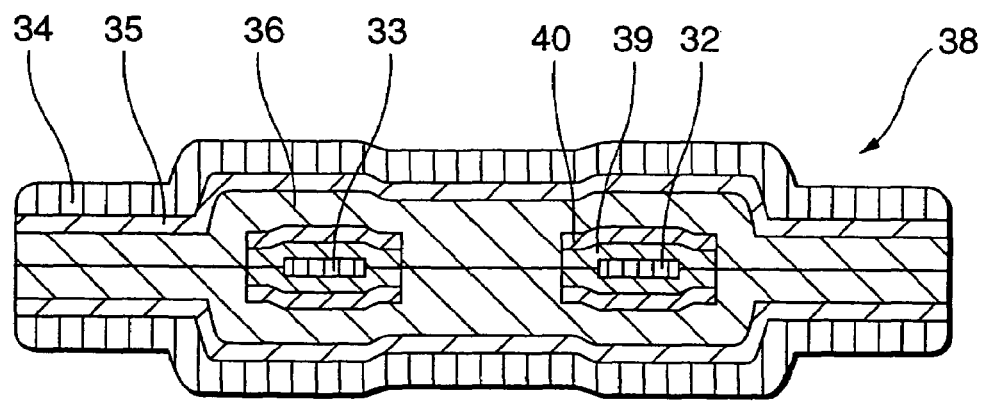
FIG. 14 is an enlarged sectional view of the welded portion taken along the line A-A' of FIG. 10.

On the other hand, the battery case 31 is formed by a metal-laminated resin sheet. The resin sheet comprises a surface protective PET film 34 having a thickness of 12 µm as the outermost layer, an aluminum foil 35 having a thickness of 20 µm as a barrier layer, and an acid-modified polyethylene layer 36 having a thickness of 100 µm as a heat-fused layer laminated in this order as shown in FIG. 14. The surface protective PET film 34 and the aluminum foil 35 are bonded to each other with an urethane-based adhesive.

A battery is prepared by enclosing the electricity-generating element 30 in the battery case 31 prepared from the resin sheet in accordance with the following procedure.

Firstly, at the first step, the opposing sides of a rectangular resin sheet were compressed to each other under heating in such an arrangement that the same surfaces thereof (acid-modified polyethylene layer 36) are brought into contact with each other so that they are fused to each other to form a welded portion 37 (=welded portion X) as shown in FIG. 11. In this arrangement, the resin sheet forms a cylindrical bag having an opening 30a at both ends thereof.

Figure 12:
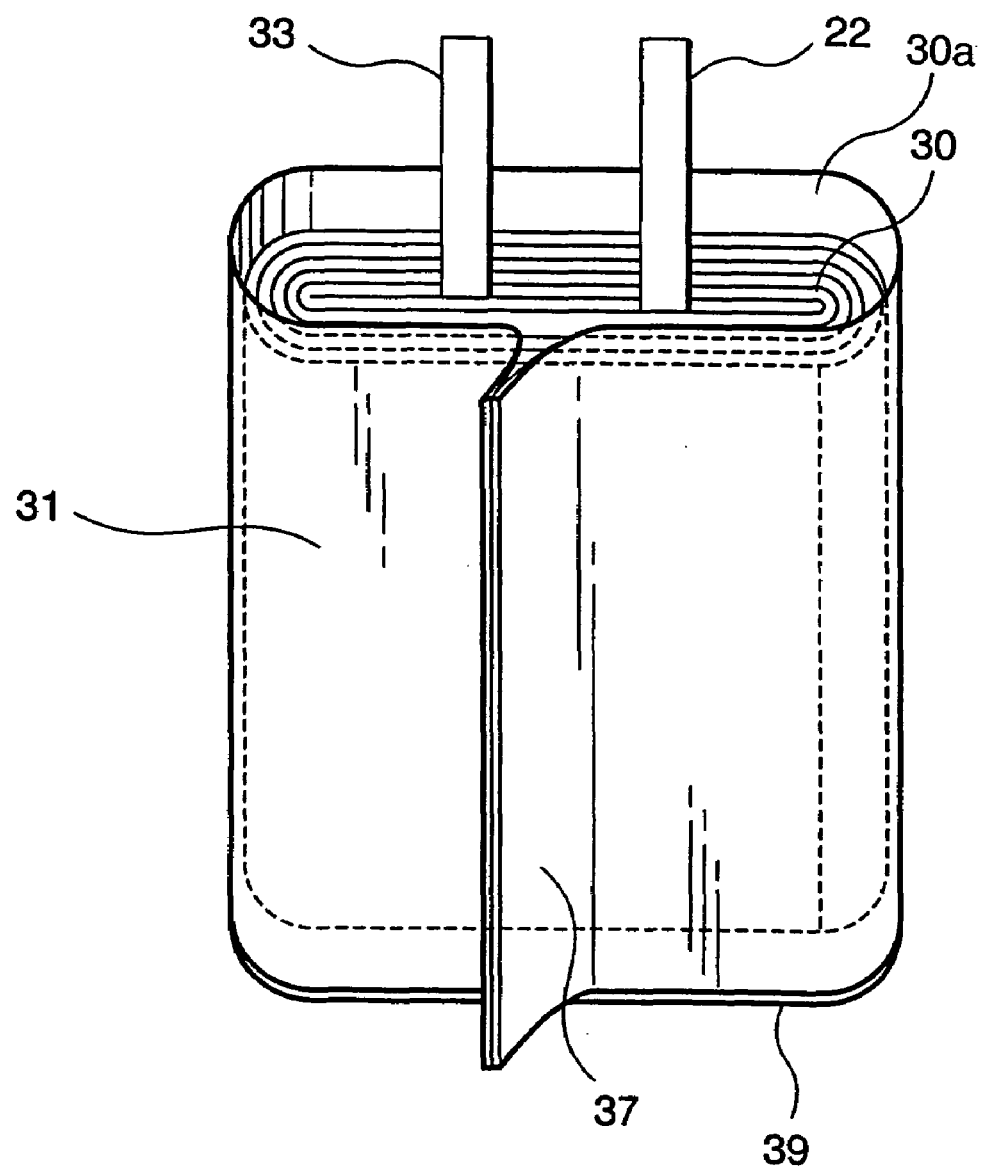
FIG. 12 is a perspective view of the battery case having an electricity-generating element received therein.

Subsequently, at the second step, the electricity-generating element 30 is received in the battery case 31 in such an arrangement that the winding axis of the electricity-generating element 30 is perpendicular to the plane of the opening 30a of the cylindrical battery case as shown in FIG. 12.

Figure 13:
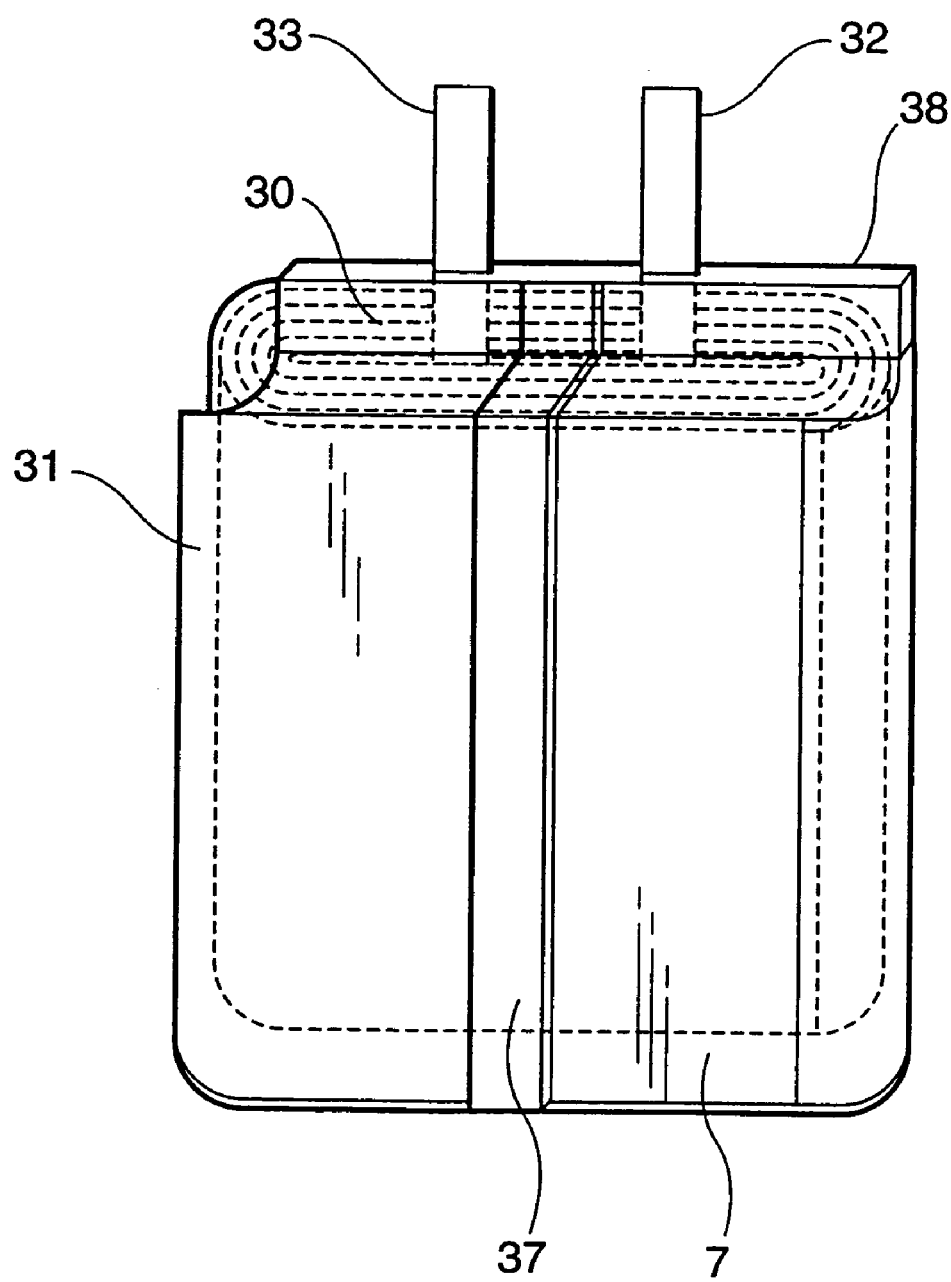
FIG. 13 is a perspective view of a sealed battery case.

Further, at the third step, the welded portion 37 (=welded portion X) of the bag-shaped battery case parallel to the winding axis of the electricity-generating element is bent down to come in contact with the outer surface of the battery case 31 as shown in FIG. 13. Subsequently, the metal-laminated resin film 2 is heat-fused at the position from which the lead terminals are drawn to form a welded portion 38 (=welded portion Y) from which the lead terminals are drawn.

To the positive electrode lead terminal 32 and the negative electrode lead terminal 33 have been previously bonded an acid-modified polyethylene layer 39 forming an adhesive layer with metal, outside of which layer 39 an Eval resin (ethylene vinyl-alcohol copolymer resin produced by KURARAY CO., LTD.) layer 40 having a thickness of 70 µm is provided as an electrolytic solution barrier layer as shown in FIG. 14. The heat-modified polyethylene layer 36 of the resin sheet is provided in close contact with the Eval resin layer 40. In this arrangement, a good airtightness can be obtained.

Thus, the battery case is sealed except at the opening opposite the opening from which the lead terminals are drawn. The electrolytic solution is then vacuum-injected into the battery case through the other opening in an amount such that the various electrodes and the separator can be thoroughly wet and there can be present no free electrolytic solution outside the electricity-generating element.

Subsequently, at the fourth step, the opposing edges of the opening opposite the welded portion 38 from which the lead terminals are drawn are heat-fused to each other to form a welded portion 39 (=welded portion Z), thereby completely sealing the battery case 31.

Finally, the welded portion 37 (welded portion X) is fixed to the side face of the battery case 31 with an adhesive or by heat fusion. In order to bond the welded portion to the side face of the battery case, any adhesive suitable for the material of the outermost layer of the resin sheet may be used.

Referring to the positional relationship between the welded portion 37 (welded portion X) and the welded portion 38 (welded portion Y) under these circumstances, the welded portion 37 (welded portion X) and the welded portion 38 (welded portion Y) cross each other on the surface of the battery case 31, and the position at which the welded portion X and the welded portion Y cross each other lies between the positive electrode lead terminal 32 and the negative electrode lead terminal 33.

The nonaqueous secondary electrolytic battery of the present embodiment thus prepared is referred to as battery 4A, and the comparative nonaqueous secondary electrolytic battery arranged such that the welded portion (=welded portion X) formed by welding a rectangular sheet with the two opposing sides opposed to each other such that the same surfaces thereof are brought into contact with each other protrudes from the surface of the battery case is referred to as battery R10. 10 samples having a nominal capacity of 500 mAh were prepared each for the batteries 4A and R10. These batteries were each subjected to charge-discharge cycle test under the following conditions.

Charge: 500 mA constant current+4.1 V constant voltage, 3 hr in total
Discharge: 500 mA constant current, terminal voltage: 2.75 V As a result, the battery 4A showed a discharge capacity of 490 mAh average over 10 samples at the 100th cycle while the battery R10 showed a discharge capacity of 465 mAh averaged over 10 samples at the 100th cycle, demonstrating that the battery 4A of the presen embodiment showed a less capacity decrease with the number of cycles. This is presumably because the welded portion 37 (=welded portion X) is fixed to the surface of the battery cas 31, making the case thicker at the area where the welded portion 37 is fixed. In such an arrangement, the electricity-generating element 30 is kept pressed at the center thereof, keeping the distance between the electrodes constant during charge-discharge cycle and hence making it possible to minimize the capacity drop with the number of cycles. Further, when a plurality of the nonaqueous secondary electrolytic batteries of the present embodiment are stacked in series with or in parallel with each other, the welded portion 37 of the battery case 31 gives no obstruction, thereby providing a high energy density battery without any unnecessary space. Thus, the nonaqueous secondary electrolytic battery of the present embodiment is favorable for stacking.

FIFTH EMBODIMENT

The present embodiment differs from the foregoing fourth embodiment in that the end of the welded portion 37 is fixed to the other welded portion 38 (welded portion Y) or welded portion 39 (welded portion Z) in the fifth embodiment while the welded portion 37 (welded portion X) is fixed to the surface of the battery case 31 with an adhesive or the like in the foregoing fourth embodiment. The other structures of the present embodiment are the same as the foregoing fourth embodiment. Therefore, duplicated description will be omitted by using the drawings and description of the fourth embodiment.

As batteries of the fifth embodiment there were prepared 10 samples each for three batteries having a nominal capacity of 500 mAh, i.e., battery 5A having the lead drawing end of the welded portion 37 fixed to the welded portion 38 (welded portion Y) with an adhesive, battery 5B having the end of the welded portion 37 opposite-the lead drawing side fixed to the welded portion 39 (welded portion Z) with an adhesive and battery 5C having both ends of the welded portion 37 fixed to the welded portion 38 (welded portion Y) and the welded portion 39 (welded portion Z) with an adhesive. The comparative battery R10 of the foregoing fourth embodiment and the foregoing batteries 5A, 5B and 5C were then subjected to charge-discharge cycle test under the following conditions.

Charge: 500 mA constant current+4.1 V constant voltage, 3 hr in total
Discharge: 500 mA constant current, terminal voltage: 2.75 V As a result, the discharge capacity averaged over 10 samples at 100th cycle is set forth in Table 7 below.

TABLE 7

| Battery | Average discharge capacity |
| --- | --- |
| 5A | 488 mAh |
| 5B | 490 mAh |
| 5C | 493 mAh |
| 10R | 462 mAh |

As can be seen in Table 7, the batteries 5A, 5B and 5C of the present embodiment showed a less capacity drop with the number of cycles than the comparative battery R10. This is presumably because the welded portion 37 (=welded portion X) is fixed to at least one of the welded portion 38 (=welded portion Y) at the lead drawing side and the welded portion 39 (=welded portion Z) opposite the welded portion 38 as in the foregoing fourth embodiment, causing the welded portion X to be pressed onto the surface of the battery case 31 and making the case 31 thicker at the area where the welded portion 37 is fixed. In this arrangement, the electricity-generating element 30 is kept pressed at the center thereof, keeping the distance between the electrodes constant during charge-discharge cycle. Further, when a plurality of the batteries 5A, 5B and 5C of the present embodiment are stacked in series with or in parallel with each other, the welded portion 37 of the battery case 31 gives no obstruction, thereby providing a high energy density battery without any, unnecessary space. Thus, these batteries are favorable for stacking.

SIXTH EMBODIMENT

The present embodiment differs from the foregoing fourth embodiment in that a fixing tape is wound on the electricity-generating element 30 of the fourth embodiment. The other structures of the present embodiment are the same as that of the fourth embodiment. Like reference numerals are used for like parts to omit duplicated description.

Figure 15:
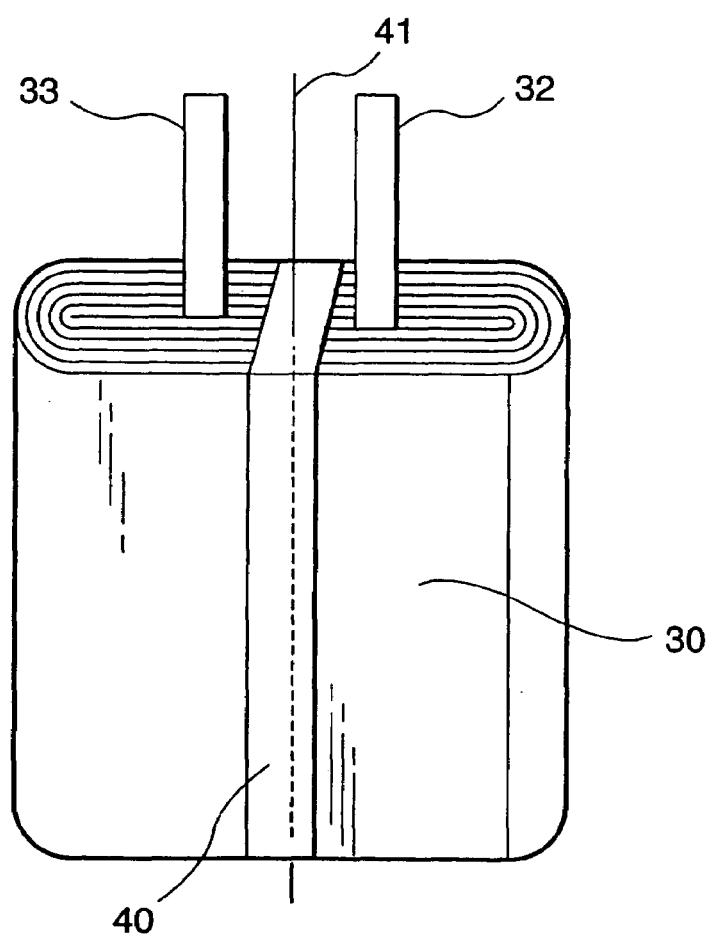
FIG. 15 is a perspective view of the electricity-generating element of a nonaqueous secondary electrolytic battery according to the sixth embodiment of implication of the present invention.
Figure 16:
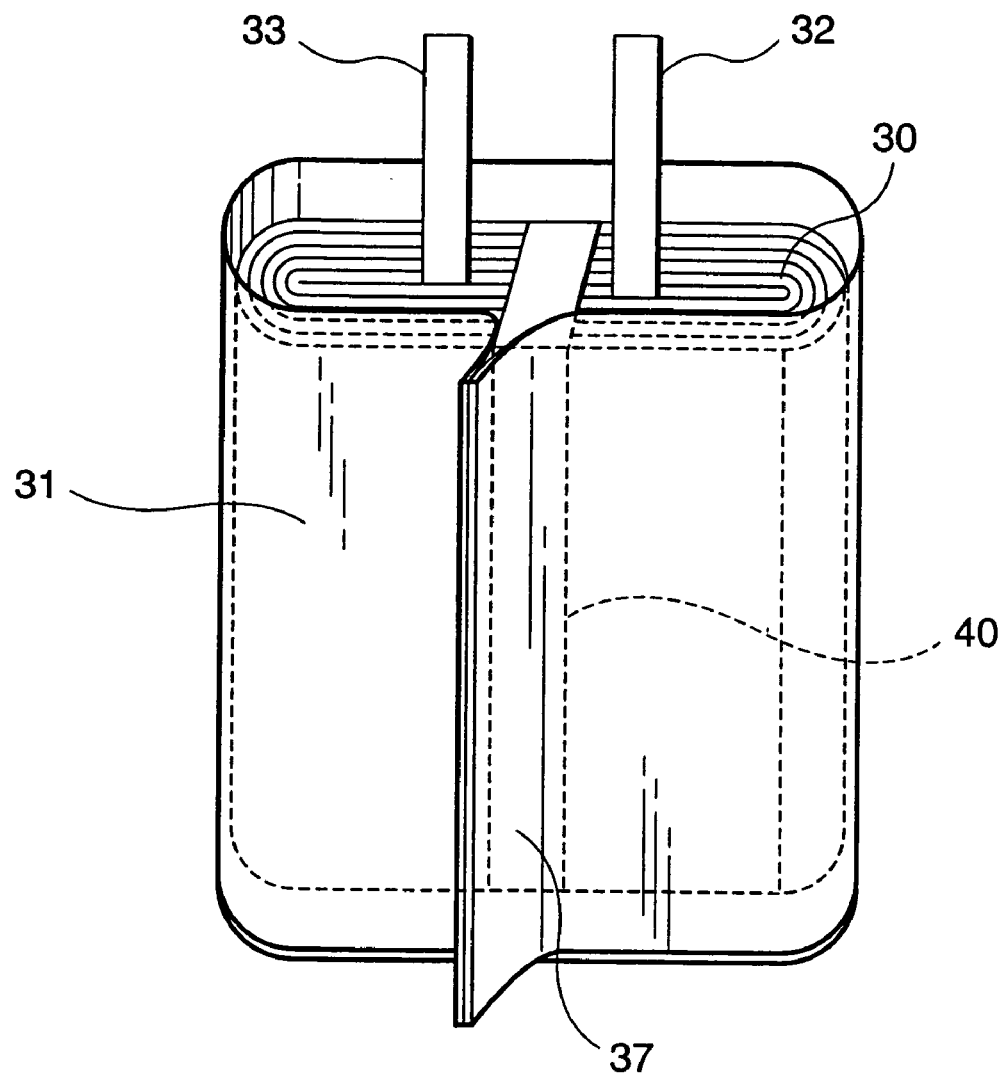
FIG. 16 is a perspective view of a battery case having an electricity-generating element received therein.
Figure 17:
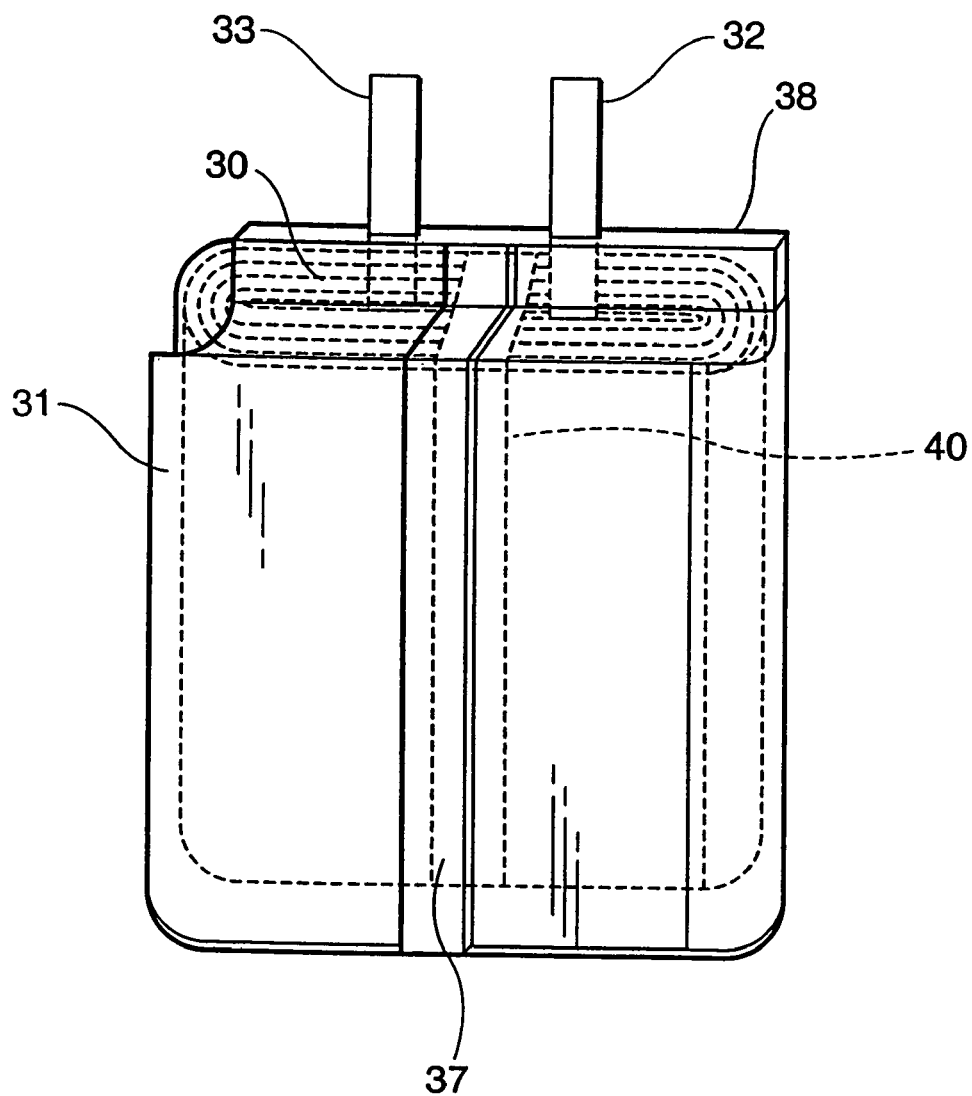
FIG. 17 is a perspective view of a sealed battery case.

The foregoing fixing tape 40 is wound on the electricity-generating element 30 along the winding axis 41 by one ore more turns as shown in FIG. 15. Thus, the fixing tape 40 passes between the two lead terminals 32 and 33 on the end face of the electricity-generating element 30 at the lead drawing side thereof. When the electricity-generating element 30 is received and enclosed in the battery case 31, the welded portion 37 of the battery case 31 along the winding axis overlaps the fixing tape 40. The welded portion 37 is brought into close contact with and bonded to the surface of the battery case 31 with an adhesive. However, the two parts may be connected to each other by heat fusion. Alternatively, the welded portion 37 may be bonded or welded to the welded portion 38 and/or welded portion 39.

The battery 6A of the sixth embodiment and the comparative battery R11, in which the welded portion 37 falls out of the position of the fixing tape 40, were subjected to charge discharge cycle test under the following conditions. The discharge capacity averaged 10 samples was measured at 100th cycle. As a result, the battery 6A of the present embodiment showed 496 mAh and the comparative battery R11 showed 465 mAh. It was thus confirmed that the battery 6A of the present embodiment shows a small capacity drop with the number of cycles.

Charge: 500 mA constant current+4.1 V constant voltage, 3 hr in total

Discharge: 500 mA constant current, terminal voltage: 2.75 V

Thus, the nonaqueous secondary electrolytic battery of the present embodiment is arranged such that the welded portion 37 parallel to the winding axis 41 of the electricity-generating element 30 overlaps the fixing tape 40, keeping the electricity-generating element 30 pressed at the overlapping area and hence keeping the distance between the electrodes during charge cycle. Thus, the capacity drop with the number of cycles can be minimized.

SEVENTH EMBODIMENT

Figure 18:
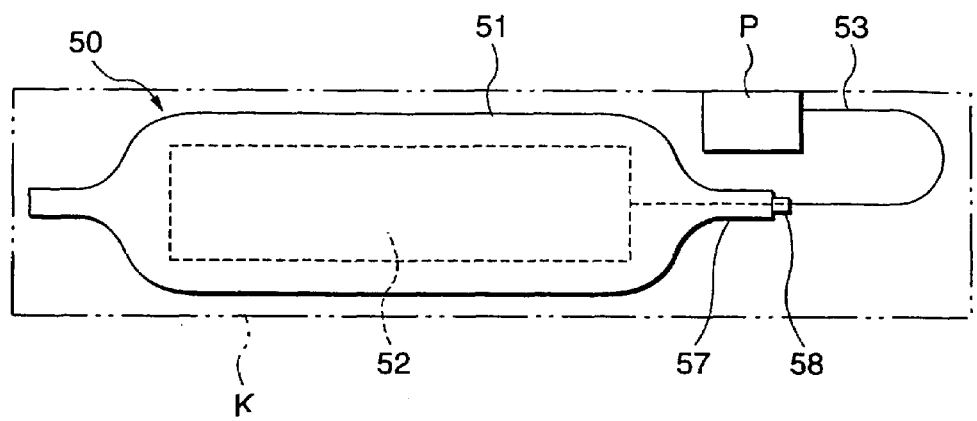
FIG. 18 is a side view of a battery according to the seventh embodiment of implication of the present invention.
Figure 19:
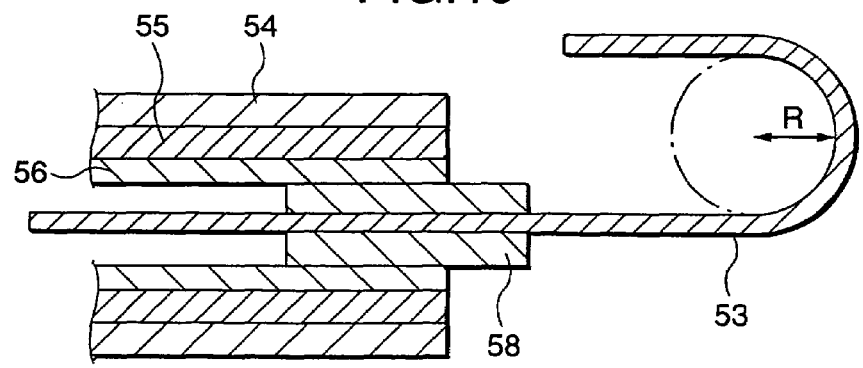
FIG. 19 is an enlarged sectional view of the welded portion.

The seventh embodiment of implication of the present invention will be described in connection with FIGS. 18 and 19.

The battery 50 of the present embodiment comprises a battery case 51, an electricity-generating element 52 and a lead terminal 53. The battery 50 is received in an outer box K.

The battery case 51 is formed by a laminated resin sheet comprising a surface protective layer 54 made of an insulating resin, a barrier layer 55 made of a metal, and a fused layer 56 made of an insulating resin. The battery case 51 is prepared by heat-fusing the periphery of the film. The thickness of the layers 54, 55 and 56 are, for example, 12 μm, 9 μm and 100 μm, respectively. The layers 54, 55 and 56 are made of PET, aluminum and acid-modified polyethylene, respectively.

The electricity-generating element 52 is prepared by spirally winding a laminate of a positive electrode plate having a positive electrode compound containing an active positive electrode material applied to a collector, a separating material as a separator and a negative electrode plate having a negative electrode compound containing an active negative electrode material applied to a collector. The electricity-generating element 51 is received in the battery case into which an electrolytic solution is then injected. As the collector for positive electrode plate there was used an aluminum foil. As the active material there was used a lithium-cobalt composite oxide. As the collector for negative electrode plate there was used a copper foil. As the host material there was used graphite. As the separator there was used a polyethylene microporous membrane. As the electrolytic solution there was used a 4:6 (by volume) mixture of ethylene carbonate and methyl ethyl carbonate containing 1 mol/l of $LiPF_6$.

The lead terminal 53 is flat. The lead terminal 53 is connected to the positive electrode plate and negative electrode plate and is exposed to the exterior of the battery case 51 between the resin sheets at the welded portion 57 of the battery case 51. The area at which the lead terminal 53 crosses the end face of the resin is covered by a tube 58 made of an insulating resin such as acid-modified polyethylene having a thickness of 100 μm. In this arrangement, the battery case 51 can be kept airtight. At the same time, the lead terminal 53 and the barrier layer 55 of the battery case 51 can be prevented from coming in contact with each other to cause shortcircuiting.

The lead terminal 53 is bent outside the battery case 51 and connected to a protective circuit P provided inside the outer box K. The lead terminal 53 is bent using a jig in such a manner that the radius of curvature falls within the range of from 0.5 mm to 4 mm. Accordingly, the lead terminal 53 cannot break. Nevertheless, the entire size of the battery 50 can be reduced. In this arrangement, the battery 50 can be received in the outer box K having a smaller size than ever. As a result, electronic apparatus can be further miniaturized. The lead terminal 53 preferably has a width of from 2 mm to 7 mm and a thickness of from 0.05 mm to 2.0 mm. The material suitable for the lead terminal 53 is aluminum, nickel or copper.

The preparation of the battery 50 of the present embodiment is carried out in the same manner as the conventional preparation process except that the lead terminal 53 is finally bent.

The lead terminal 53 was prepared unbent, and then examined for how many times it can be bent using the jig until it breaks. As the jigs there were prepared those having a radius of 0.2 mm, 0.3 mm, 0.4 mm, 0.5 mm and 1.0 mm. Thus, comparative batteries R12, R13 and R14 and batteries 8A and 8B of the present embodiment were prepared. Referring to the size of the lead terminal 53, the lead terminal 53 has a width of 3 mm and a thickness of 0.1 mm. Referring to the material of the lead terminal 53, aluminum was used for positive electrode and nickel was used for negative electrode. The results are set forth in Table 8.

TABLE 8

| Battery | Radius of curvature (mm) | Number of bending cycles to break | |
|---|---|---|---|
| | | Positive electrode | Negative electrode |
| R12 | 0.2 | 1 | 1 |
| R13 | 0.3 | 1-2 | 3-4 |
| R14 | 0.4 | 2-4 | 5-7 |
| 8A | 0.5 | 10-13 | 30-40 |
| 8B | 1.0 | 25-37 | 50 or more |

As can be seen in Table 8, there was confirmed a remarkable difference between the batteries having a lead terminal bent at a radius of 0.4 mm or less and the batteries having a lead terminal bent at a radius of 0.5 mm or more. It was thus made obvious that the batteries 8Aa and 8B having the lead terminal 53 bent at a radius of 0.5 mm or more are little liable to breakage of lead terminal 53.

Accordingly, in order to bend the lead terminal 53, the lead terminal 53 is preferably bent at an angle of 180 degrees with a jig having a radius of from 0.5 mm to 4 mm in contact with the position to be bent.

20 samples each for the battery 8A having the lead terminal 53 bent at a radius of 0.5 mm and the battery 8B having the lead terminal 53 bent at a radius of 1.0 mm were prepared. Subsequently, these samples were each received in the outer box K. The lead terminal 53 was then connected to the protective circuit P. The battery 50 was fixed to the inner wall of the outer box K with a double-sided adhesive tape. Vibration (amplitude: 4 mm; frequency: 1,000 cpm) was then applied to the battery for 1 hour each in the longitudinal direction, in the crosswise direction and in the vertical direction. Thereafter, the lead terminal 53 was examined for breakage. 20 samples each for comparative batteries R12 to R14 having a lead terminal bent at a radius of 0.2 mm, 0.3 mm and 0.4 mm, respectively, were prepared and similarly examined. The results are set forth in Table 9. The other conditions of lead terminal 53 are the same as that of the batteries 8A and 8B.

TABLE 9

| Battery | Number of batteries showing breakage |
|---------|--------------------------------------|
| R12     | 20                                   |
| R13     | 18                                   |
| R14     | 5                                    |
| 8A      | 0                                    |
| 8B      | 0                                    |

As can be seen in the table above, none of the samples of the batteries 8A and 8B of the present embodiment showed breakage of lead while all the samples of the comparative batteries showed breakage of lead. It was thus confirmed that the batteries 8A and 8B of the present embodiment undergo no breakage of lead terminal even under the application of vibration.

EIGHTH EMBODIMENT

Figure 20:
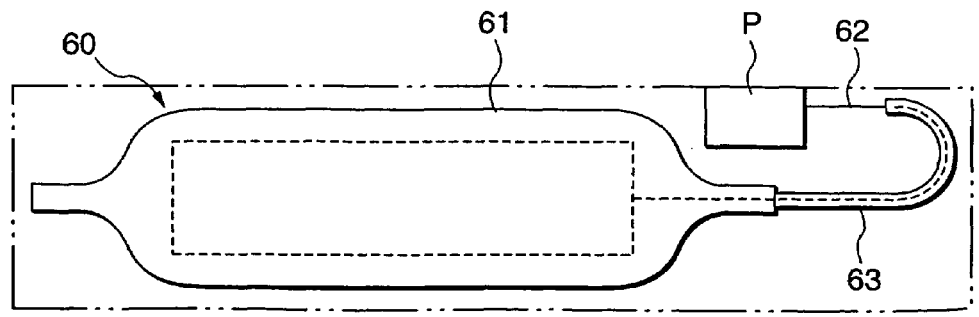
FIG. 20 is a side view of a battery according to the eighth embodiment of implication of the present invention.

The front view of a battery according to the eighth embodiment of implication of the present invention is shown in FIG. 20.

The battery 60 according to the present embodiment of implication of the present invention is the same as the battery 50 of the foregoing seventh embodiment except that the lead terminal 62 is covered by a tube 63 up to the bent portion. The tube 63 covers the bent portion of the lead terminal 62. In this arrangement, the shortcircuiting of the lead terminal 62 with the barrier layer of the battery case 61 can be prevented.

The arrangement of the tube 63 can keep the battery airtight similarly to the first embodiment.

Referring to the material of the tube 63, the tube 63 is preferably made of the same material as the fused layer of the battery case 61 because it is interposed between the fused layer of the battery case 61 and the lead terminal 62. Even when the tube 63 can be provided only at the bent portion of the lead terminal 62, the lead terminal 62 can be prevented from breaking. In this case, it is not necessary that the tube 63 be made of the same material as the fused layer. In order to bend the lead terminal 62, the lead terminal 62 is preferably bent using a jig at a radius of from 0.5 mm to 4 mm. However, a proper jig must be selected taking into account the thickness of the tube 63. For example, when the thickness of the tube 63 is 100 μm, a jig having a radius of from 0.4 mm to 3.9 mm is preferably selected.

In the present embodiment, the battery 60 shown in FIG. 20 was examined for shortcircuiting during preparation. Using a jig having a radius of 0.4 mm, 1,000 samples of the battery 60 were tested. The tube 63 was made of an acid-modified polyethylene and had a thickness of 100 μm. The other conditions are the same as that shown in the seventh embodiment. As a comparative example, a battery having a lead terminal bent at a radius of 0.5 mm prepared in the same manner as the battery 60 of the eighth embodiment except that the lead terminal 62 was not covered by the tube 63 was similarly tested.

As a result, ten out of 1,000 samples of the comparative battery showed shortcircuiting of lead with barrier layer. On the other hand, none of 1,000 samples of the battery having the lead terminal covered by the tube 63 showed shortcircuiting. It was thus confirmed that the coverage of the lead terminal 62 by the tube 63 makes it possible to minimize shortcircuiting during the trial manufacture of batteries.

NINTH EMBODIMENT

Figure 21:
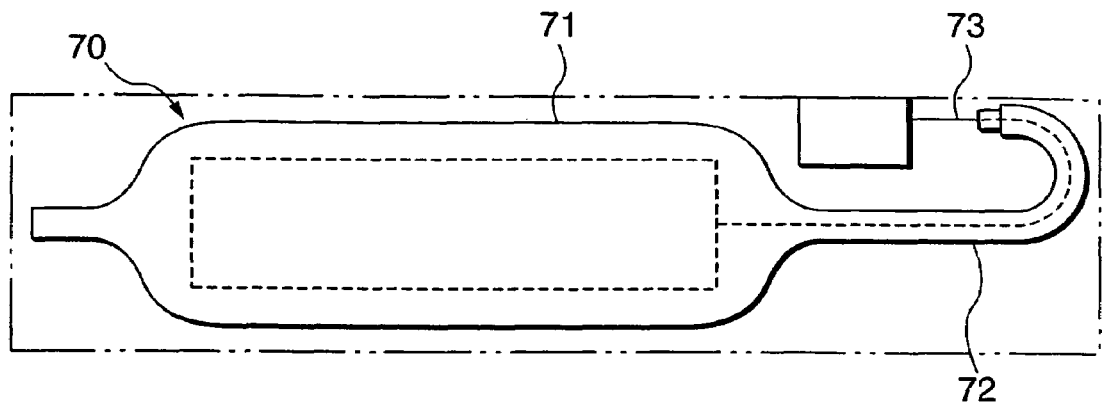
FIG. 21 is a side view of a battery according to the ninth embodiment of implication of the present invention.
Figure 22:
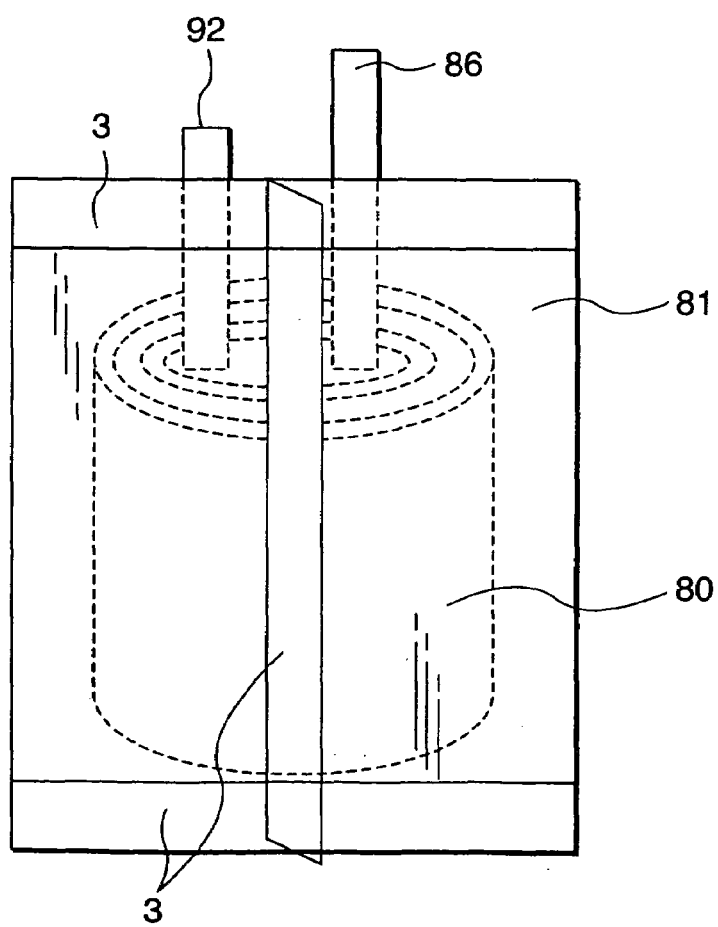
FIG. 22 is a side view of a battery according to the eleventh embodiment of implication of the present invention.

A battery according to the night embodiment of implication of the present invention will be described in connection with FIG. 21.

In the battery 70 of the present embodiment, the welded portion 72 of the battery case 71 is longer than that of the battery 50 of the seventh embodiment and extends to the bent portion of the lead 73. The other conditions are the same as that of the battery 50 of the seventh embodiment. Accordingly, the bent portion of the lead 73 comes in close contact with the resin sheet constituting the battery case 71, increasing the resistance of the lead 73 against bending load and hence making it more difficult for the lead 73 to break. In order to bend the lead 73, the thickness of the resin sheet must be taken into account of as in the eighth embodiment. Care must be taken not only to prevent the lead from breaking but also to prevent the resin sheet from breaking or wrinkling.

In the present embodiment, the following test was conducted. Two samples of the battery 70 having a lead 73 provided unbent were prepared. Subsequently, the lead 73 of one of the two samples was bent using a jig having a radius of 0.3 mm, and the lead 73 of the other was bent using a jig having a radius of 0.4 mm. These batteries were each observed for bent portion under microscope. The thickness of the resin sheet was 100 μm.

As a result, none of these samples showed breakage of lead 73. However, the battery having the lead 73 bent using the jig having a radius of 0.3 mm was observed broken in the laminate film outside the bent portion and wrinkled in the laminate film inside the bent portion. It is thus preferred that a jig having a radius of 0.4 mm or more be used to bend the lead 73 of the battery 21 of the present embodiment at a radius of 0.5 mm or more.

TENTH EMBODIMENT

The battery according to the tenth embodiment of implication of the present invention has the same structure as the foregoing fourth embodiment and comprises an ellipsoidally wound electricity-generating element 30 received in a bag-shaped battery case 31 formed by heat-fusing a metal-laminated resin sheet together with a nonaqueous electrolytic solution (not shown) as shown in FIGS. 10 to 14. Drawn from the electricity-generating element 30 are flat stripped lead terminals 32 and 33 which are directly connected to the edge of the positive electrode plate and negative electrode plate, respectively, by ultrasonic welding or caulking. The lead terminals 32 and 33 are linearly drawn out of the battery case 31 through the welded portion 38. The term "linearly" as used herein is meant to indicate that the flat stripped collector lead has no bent and curved portion but forms a straight line in the longitudinal direction.

In the present embodiment, the battery was hermetically sealed in a chamber which had been evacuated to a pressure lower than ordinary atmospheric pressure (760 mmHg). Thus, five batteries 10A to 10E were prepared at a pressure of 720 mmHg, 700 mmHg, 600 mmHg, 300 mmHg and 170 mmHg, respectively. As a comparative battery R15, a battery was tentatively manufactured comprising as a positive electrode lead terminal an aluminum lead having a nickel lead ultrasonically welded thereto which is directly connected to the collector of the positive electrode plate. The structure of the comparative battery R15 except that of the positive electrode lead is the same as that of the battery 10A of the present embodiment.

50 samples each for the batteries 10A to 10E of the present embodiment and the comparative battery R15 were subjected to the following test. In some detail, these batteries were subjected to charging at 1 CmA (500 mA)/4.1V for 3 hours and vibration test involving vibration having an amplitude of 0.8 mm and a frequency of 10 Hz, 100 Hz, 10 Hz, 300 Hz and 10 Hz sweeping in this order at a rate of 1 Hz/min in the three intersecting directions X, Y and Z. The temperature of the surface of the battery and the open circuit voltage (hereinafter referred to as "OCV") during the vibration test were then measured. OCV and the internal resistance of the batteries which had been tested were then measured. The results are set forth in Table 10.

TABLE 10

| Battery | Number of ruptured/ ignited batteries | Number of batteries showing fuming | Number of batteries showing leakage of electrolytic solution | Number of batteries showing change of OCV/surface temperature |
|---|---|---|---|---|
| 10A | 0 | 0 | 2 | 5 |
| 10B | 0 | 0 | 0 | 2 |
| 10C | 0 | 0 | 0 | 0 |
| 10D | 0 | 0 | 0 | 0 |
| 10E | 0 | 0 | 0 | 0 |
| 15R | 0 | 3 | 6 | 23 |

As a result of the foregoing vibration test, the batteries 10A to 10E according to the embodiment of the invention showed no abnormalities such as ignition and fuming while some samples of the comparative battery R15 showed fuming and leakage of electrolytic solution.

The samples of the battery 10A which had shown change of OCV or surface temperature of battery were disassembled. The electricity-generating element 30 of these samples were then visually observed. The following facts were made obvious. In some detail, the positive electrode lead terminal 32 was observed deformed or buckled to form folded portion. It was also confirmed that holes having a diameter of about 0.5 mm provably developed by the melting of the folded portion had been formed. It is presumed that those holes had been formed by the contact of the buckled positive electrode lead terminal 32 with the edge of the negative electrode plate during the vibration test.

Similarly, the samples of the comparative battery R15 which had shown fuming were disassembled. The electricity-generating element 30 of these disassembled samples were then observed. As a result, the following facts were recognized. In some detail, the positive electrode lead terminal 32 was observed broken at the area (ultrasonically welded portion) where the nickel lead disposed outside the battery case 30 and the aluminum lead connected to the positive electrode plate are connected to each other, and the nickel lead was observed partly piercing the end face of the electricity-generating element. It is presumed that shortcircuiting had occurred at the pierced portion, causing rapid temperature rise and fuming.

Subsequently, 50 samples of the batteries 10A to 10E of the present embodiment and the comparative battery R15 were subjected to the following test. In some detail, these batteries were each subjected to charging at 1 CmA (500 mA)/4.2V for 3 hours and then allowed to stand at a temperature of 60° C. for 30 days. The internal resistance and discharge capacity of these batteries averaged over 50 samples before and after storage are set forth in Table 11.

TABLE 11

| Battery | Discharge capacity before storage (mAh) | Internal resistance before storage (mΩ) | Discharge capacity after storage (mAh) | Internal resistance after storage (mΩ) |
|---|---|---|---|---|
| 10A | 521 | 45 | 468 | 70 |
| 10B | 522 | 43 | 473 | 63 |
| 10C | 522 | 42 | 473 | 57 |
| 10D | 524 | 43 | 475 | 56 |
| 10E | 524 | 40 | 479 | 57 |
| 10R | 522 | 45 | 420 | 121 |

For the measurement of discharge capacity, the batteries were each charged at 1 CmA (500 mA), 4.2 V and 25° C. for 3 hours, and then discharged at 1 CmA to 2.75 V. The internal resistance was measured with a 1 kHz ac.

The comparison of the rise in the internal resistance measured after 60C-30 day storage test from that measured before the storage test shows that the batteries 10A to 10E showed an internal resistance rise of from 13 mΩ to 25 mΩ while the comparative battery R15 showed an internal resistance rise of 76 mΩ.

The battery 10E of the present embodiment and the comparative battery R15 which had been allowed to stand was disassembled. The electricity-generating element 30 of the battery was then visually observed. As a result, the following facts were recognized. In other words, the battery 10E of the present embodiment showed no change of the external appearance of the positive electrode lead terminal 32 while the positive electrode lead terminal of the comparative battery R15 was observed corroded at the position where aluminum and nickel are connected to each other. This is presumably one of the causes of the increase of the rise in internal resistance.

Thus, the batteries 10A to 10E of the present embodiment can be assured safety in the use under vibration and can be prevented from decreasing in the discharge capacity or increasing in the internal resistance during use at high temperatures. Further, since the inner pressure of the batteries 10A to 10E falls below the atmospheric pressure (preferably 600 mmHg or less), the resulting difference between the atmospheric pressure and the inner pressure of the batteries causes the electricity-generating element to be pressed. In this arrangement, the distance between the electrodes in the electricity-generating element can be kept constant, making it possible to provide a battery having good charge-discharge properties.

ELEVENTH EMBODIMENT

The eleventh embodiment of implication of the present invention will be described in connection with FIGS. 22 to 25. The nonaqueous secondary electrolytic battery according to the present embodiment comprises an ellipsoidally wound electricity-generating element 80 having a positive electrode plate, a separating material and a negative electrode plate received in a bag-shaped battery case 81 made of a resin sheet together with a nonaqueous electrolytic solution (not shown) in such an arrangement that the winding axis of the electricity-generating element 80 is perpendicular to the plane of the opening of the battery case 81. The external appearance of this nonaqueous secondary electrolytic battery is shown in FIG. 1.

Figure 23:
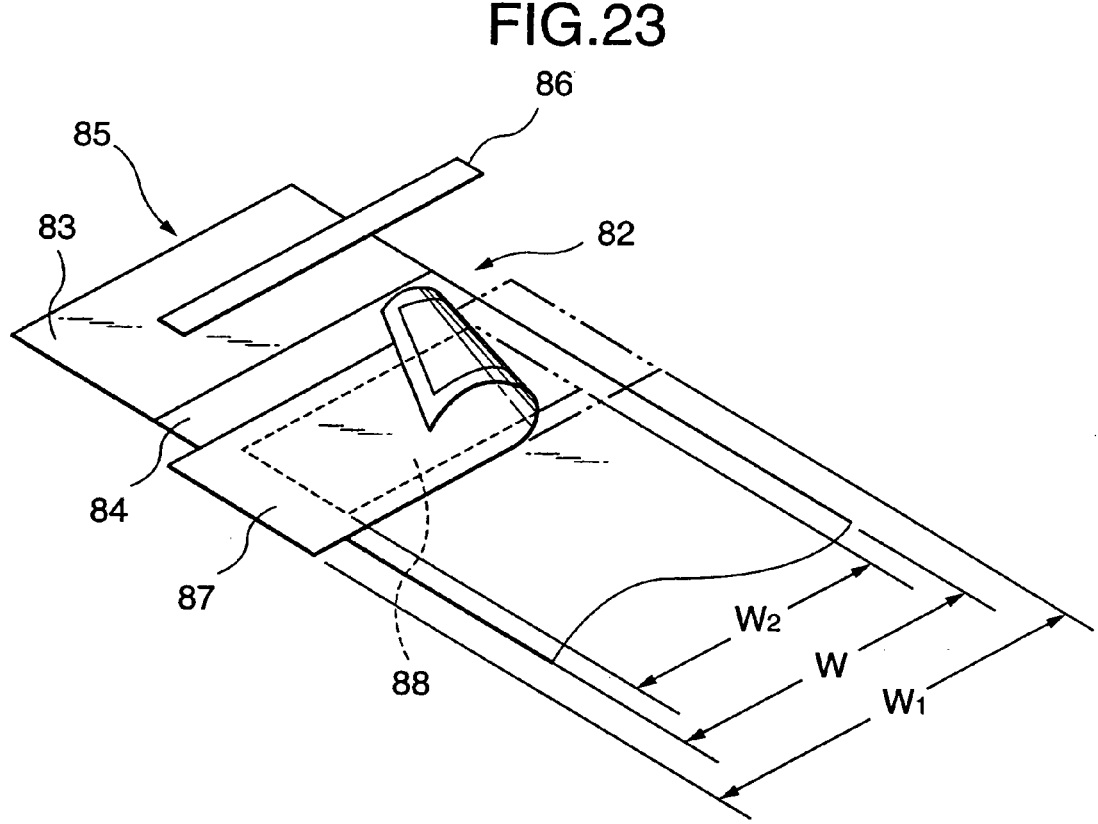
FIG. 23 is a perspective view of the end of a positive electrode plate.
Figure 24:
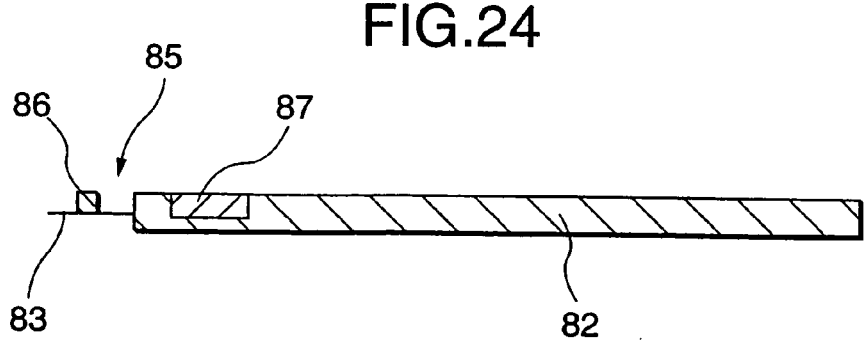
FIG. 24 is a sectional view of the end of the positive electrode plate.

As the active positive electrode material there was used a lithium-cobalt composite oxide. A positive electrode plate 82 comprises the foregoing lithium-cobalt composite oxide retained as an active material layer 84 on both surfaces of a collector 83. The collector 83 is an aluminum foil having a thickness of 20 μm. The positive electrode plate 82 was prepared by a process which comprises mixing 8 parts of a polyvinylidene fluoride as a binder and 5 parts of acetylene black as an electrically-conducting agent with 87 parts of the active material, properly adding N-methylpyrrolidone to the mixture, pasting the mixture to prepare a positive electrode compound, applying the positive electrode compound to both surfaces of the collector 83, and then drying the coated material. In this case, the collector 83 has an exposed area free of positive electrode compound formed at the end thereof. The positive electrode plate 82 has a thickness of 180 μm and a width W of 49 mm. A positive electrode lead terminal 86 was welded to the exposed area of the collector. An adhesive insulating polyimide tape 87 was then stuck to the positive electrode plate 82 at a position remote from the lead terminal 86. The insulating tape 87 has a width $W_1$ of 55 mm and a length of 25 mm. The width $W_2$ over which an adhesive 88 is applied is 35 mm. The adhesive is not present on a 10 mm margin at the two longitudinal ends of the insulating tape. Accordingly, there is given a relationship $W_2 < W < W_1$ as shown in FIG. 23.

On the other hand, the negative electrode plate 90 was similarly prepared by a process which comprises mixing 92 parts of graphite as an active negative electrode material and 8 parts of a polyvinyl fluoride as a binder, properly adding N-methylpyrrolidone to the mixture, pasting the mixture to prepare a negative electrode compound, applying the negative electrode compound to both surfaces of a collector, and then drying the coated material. As a collector 92 for the negative electrode plate 90 there was used a copper foil having a thickness of 14 μm. The negative electrode plate 90 has a thickness of 170 μm and a width of 51 mm. The negative electrode plate 90, too, has the collector free of negative electrode compound and exposed at the end thereof. A negative electrode lead terminal 92 was welded to the exposed area on the collector. An adhesive insulating polyimide tape 87 was then stuck to the negative electrode plate 90 at a position remote from the lead terminal 86 similarly to the positive electrode plate. The separating material (separator) 95 is a polyethylene microporous membrane having a thickness of 25 μm and a width of 53 mm.

Figure 25:
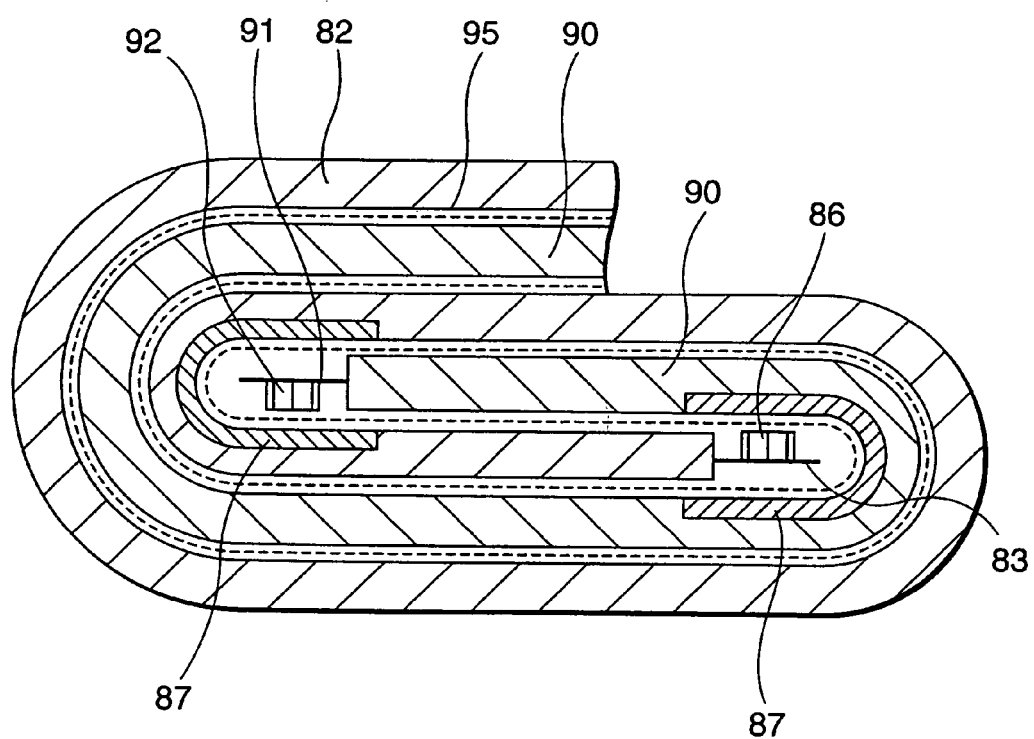
FIG. 25 is a sectional view of the portion at which the winding of an electricity-generating element begins.

A laminate of the positive electrode plate 82, the negative electrode plate 90 and the separator 95 in this order was then ellipsoidally wound on a rectangular core in such an arrangement that the long side of the rectangle is parallel to the winding axis of the electricity-generating element 80 to form an electricity-generating element 80. FIG. 25 illustrates a section of the core of the electricity-generating element 80. The insulating tape 87 for negative electrode plate 90 lies on the exposed area of the collector 82 of the positive electrode plate 82, and the insulating tape 87 for positive electrode plate 82 lies on the exposed area of the collector of the negative electrode plate 90.

A fixing tape made of polyethylene (having an adhesive coated on one surface thereof) was stuck to the electricity-generating element 80 thus formed at the insulated portion of the electrode along the side wall of the electricity-generating element parallel to the winding axis to a length corresponding to the width of the electrodes (length of the electricity-generating element parallel to the winding axis of the electricity-generating element) to fix the winding of the electricity-generating element.

The electricity-generating element 80 was then received in a battery case 81 formed by a metal-laminated resin sheet in such an arrangement that the winding axis of the electricity-generating element 80 is perpendicular to the plane of the opening of the battery case 81. The battery case 81 was then sealed at this opening with the lead terminals 86 and 92 fixed thereto. An electrolytic solution was then vacuum-injected into the battery case 81 in an amount such that the various electrodes and the separating material can be thoroughly wet and there can be present no free electrolytic solution outside the electricity-generating element. The electrolytic solution used is a 4:6 (by volume) mixture of ethylene carbonate and diethyl carbonate containing 1 mol/l of $LiPF_6$. Finally, the battery case 81 was sealed and welded to prepare a battery 11A having a nominal capacity of 500 mAh according to the present embodiment on a trial basis.

Subsequently, for comparison, a comparative battery R16 comprising the insulating tape 87 used in the preparation of the battery 11A having an adhesive applied to the entire surface thereof ($W_1 = W_2$) and a comparative battery R17 having the same structure as R16 except that the width of the insulating tape having an adhesive applied to the entire surface thereof is the same as the width of the electrodes ($W_2 = W = W_1$) were prepared.

The number of defectives of the battery 11A of the present embodiment and the comparative batteries R16 and R17 developed during winding are set forth in Table 12.

TABLE 12

| Battery number | Number of defectives developed at winding |
| --- | --- |
| 11A | 0/50 samples |
| R16 | 50/50 samples |
| R17 | 0/50 samples |

The comparative battery R16 had the insulating tape exposed at the adhesive-coated area thereof and thus caused the adhesive to be attached to undesired areas during winding. The resulting malwinding made it impossible to prepare good battery products on a trial basis.

The battery 11A according to the present embodiment and the comparative battery R16 were then subjected to the following test. 200 samples of these batteries were prepared. These samples were each charged with a constant current of 500 mA to 4.1 V and then charged at a constant voltage (for 5 hours in total). Thereafter, Test 1 was carried out by hammering 10 out of the 20 samples at the end face thereof until shortcircuiting occurred. The other 10 samples were pressed at a pressure of 200 kg under a flat press to conduct Test 2.

For Test 1, the highest temperature of the surface of the battery after shortcircuiting is set forth in Table 13. For Test 2, the presence or absence of shortcircuiting after 1 minute of pressing is set forth in Table 13. In Table 13, the symbol ✕ indicates that the battery shows vigorous fuming during test.

TABLE 13

| | Test 1 | | Test 2 | |
| --- | --- | --- | --- | --- |
| Battery | 11A | R17 | 11A | R17 |
| 1 | 62° C. | 69° C. | No abnormality | Shortcircuiting |
| 2 | 62° C. | >200° C.✕ | No abnormality | Shortcircuiting |
| 3 | 62° C. | >200° C.✕ | No abnormality | Shortcircuiting |
| 4 | 62° C. | >200° C.✕ | No abnormality | Shortcircuiting |
| 5 | 62° C. | 98° C. | No abnormality | No abnormality |

TABLE 13-continued

|  | Test 1 | | Test 2 | |
| --- | --- | --- | --- | --- |
| Battery | 11A | R17 | 11A | R17 |
| 6 | 62° C. | >200° C. X | No abnormality | Shortcircuiting |
| 7 | 62° C. | >200° C. X | No abnormality | Shortcircuiting |
| 8 | 62° C. | 86° C. | No abnormality | Shortcircuiting |
| 9 | 62° C. | >200° C. X | No abnormality | No abnormality |
| 10 | 62° C. | 63° C. | No abnormality | Shortcircuiting |

The battery 11a of the present embodiment was confirmed excellent in shortcircuiting resistance and safety during shortcircuiting in any of these tests as compared with the comparative battery R17.

TWELFTH EMBODIMENT

The twelfth embodiment of implication of the present invention will be described in connection with FIGS. 26 to 28.

Figure 26:
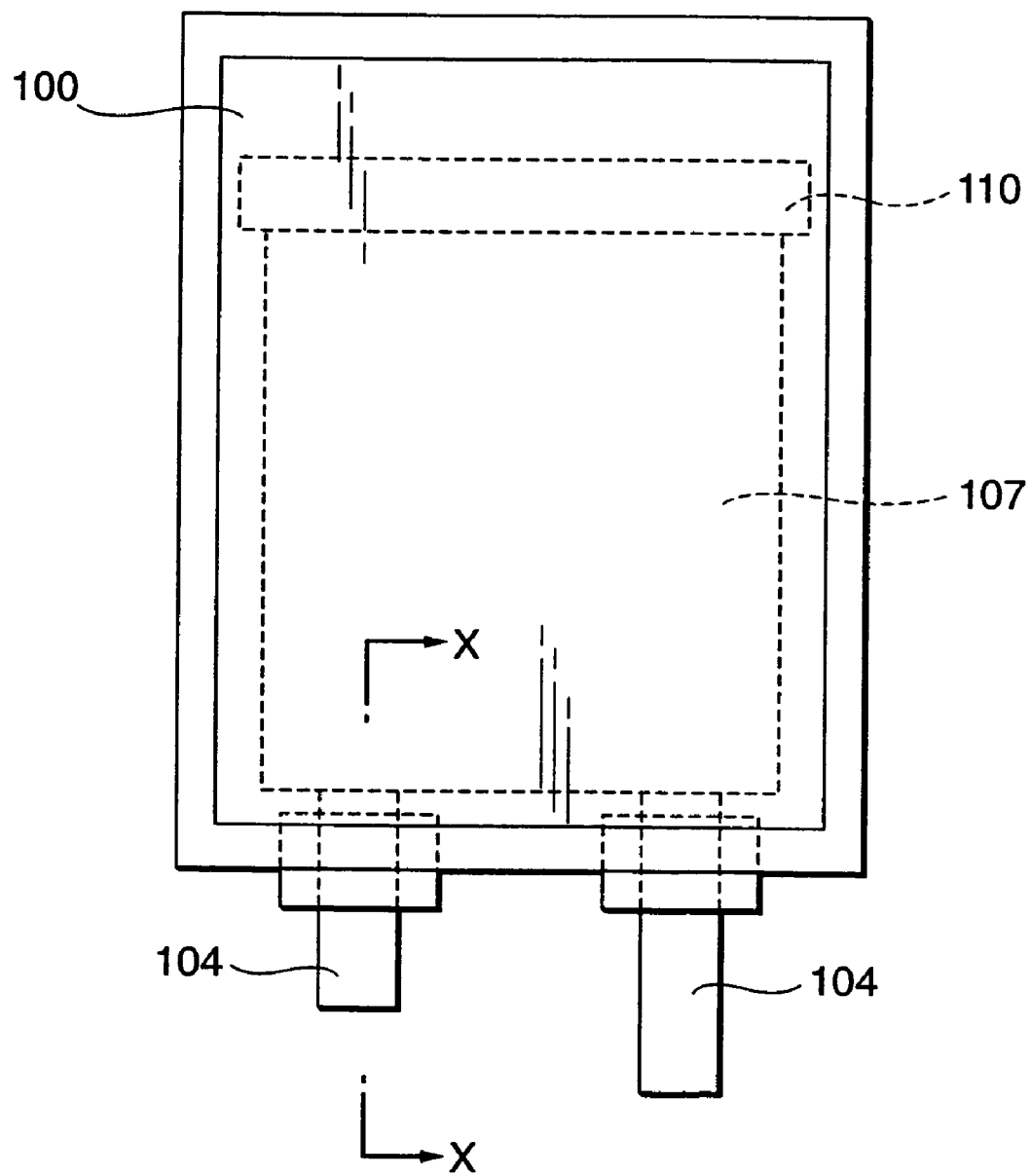
FIG. 26 is a plan view illustrating a battery according to the twelfth embodiment of implication of the present invention.

A front view of a battery prepared according to the preparation process of the present embodiment is shown in FIG. 26.

The positive electrode plate comprises a lithium-cobalt composite oxide retained as an active material on a collector. The collector is an aluminum foil having a thickness of 20 μm. The positive electrode plate was prepared by a process which comprises mixing 8 parts of a polyvinylidene fluoride as a binder and 5 parts of acetylene black as an electrically-conducting agent with 87 parts of the active material, properly adding N-methylpyrrolidone to the mixture, pasting the mixture to prepare a positive electrode compound, applying the positive electrode compound to both surfaces of the collector material, and then drying the coated material.

As the collector for negative electrode plate there was used a copper foil having a thickness of 14 μm. The negative electrode plate was prepared by a process which comprises mixing 92 parts of graphite as a host material and 8 parts of a polyvinylidene fluoride as a binder, properly adding N-methylpyrrolidone to the mixture, pasting the mixture to prepare a negative electrode compound, applying the negative electrode compound to both surfaces of the collector, and then drying the coated material.

The separator is a polyethylene microporous membrane. The electrolytic solution is a 1:1 (by volume) mixture of ethylene carbonate and diethyl carbonate containing 1 mol/l of $LiPF_6$.

Referring to the size of the various parts, the positive electrode plate has a thickness of 180 μm and a width of 49 mm, the separator has a thickness of 25 μm and a width of 53 mm, and the negative electrode plate has a thickness of 170 μm and a width of 51 mm. A laminate of these parts in this order is ellipsoidally wound on a rectangular polyethylene core to form an electricity-generating element.

Figure 27:
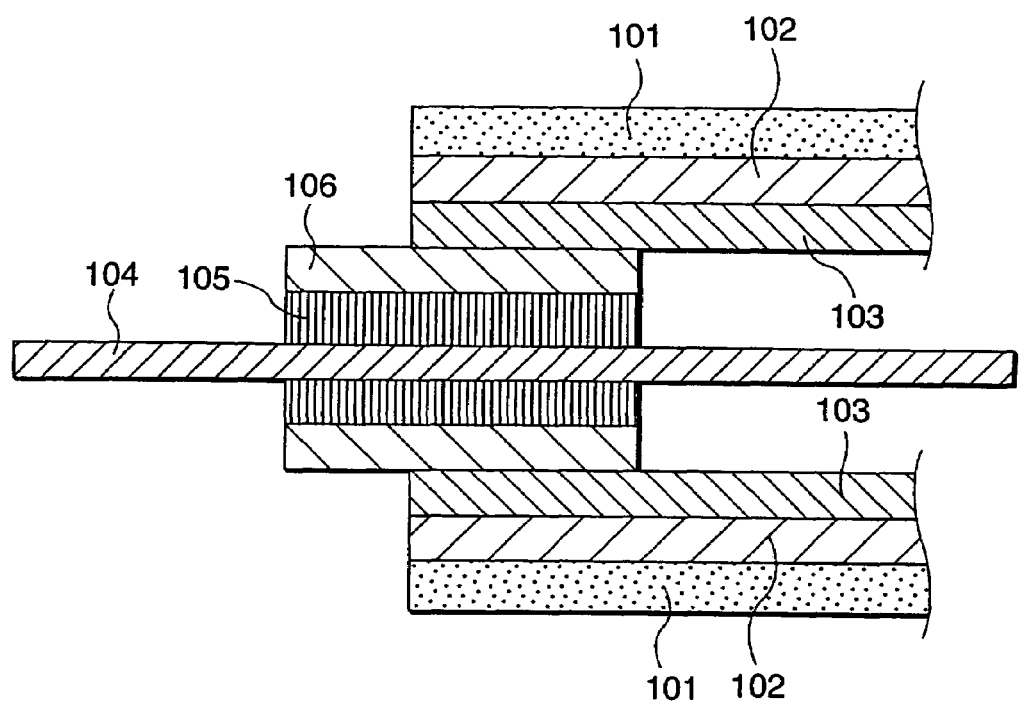
FIG. 27 is a sectional view taken along the line X-X of FIG. 26.

The resin sheet constituting a battery case 100 is made of a laminate film comprising a surface-protective PET layer 101 having a thickness of 12 μm as the outermost layer, an aluminum foil 102 having a thickness of 9 μm bonded as a barrier layer to the lower surface of the PET layer 101 with an urethane-based adhesive and an acid-modified polyethylene layer 103 having a thickness of 100 μm provided under the aluminum foil 102 as shown in a section view of FIG. 27. As the acid-modified polyethylene layer to be used as a heat-fused layer there was used one having a softening point of 100° C.

The lead terminal 104 comprises a metal conductor 104 such as copper, aluminum and nickel having a thickness of from 50 μm to 100 μm, an acid-modified PE layer 105 having a thickness of 50 μm bonded to the metal conductor 104 as a layer for bonding to metal, and an Eval resin (ethylene-vinyl alcohol copolymer resin produced by KURARAY CO., LTD.) layer 106 provided outside the layer 105 as an electrolytic solution barrier layer as shown in FIG. 27. The lamination of these parts as shown in the drawing can provide a good airtightness. The lead terminal 104 is connected to the electrode plate inside the electricity-generating element 107 and protrudes from the axial end of the electricity-generating element 107. As the material of the positive electrode plate there was used aluminum. As the material of the negative electrode plate there was used nickel.

A foam-preventive material 110 is provided on the end of the electricity-generating element 107 opposite the lead drawing portion. The foam-preventive material 110 is an unwoven cloth of long fiber made of polypropylene (produced by ASAHI CHEMICAL INDUSTRY CO., LTD.) and has a thickness of 0.23 mm, a tear strength of 0.40 kg both in the longitudinal and crosswise directions and a weight of 22 g/m². The foam-preventive material 110 is fixed to the end of the electricity-generating element 107 opposite the lead terminal 104 with an adhesive so as to cover entirely the end. The foam-preventive material 110 may be merely brought into the end of the electricity-generating element 107. However, when the foam-preventive material 110 is fixed to the electricity-generating element 107 with an adhesive in this battery, the electrolytic solution can be prevented from leaking out of the battery case even if the battery case 100 has not been completely sealed. In this battery, the lead terminal 104 and the foam-preventive material 110 are provided on the opposite sides across the electricity-generating element 107. However, the two parts may be provided on the same side.

Figure 28:
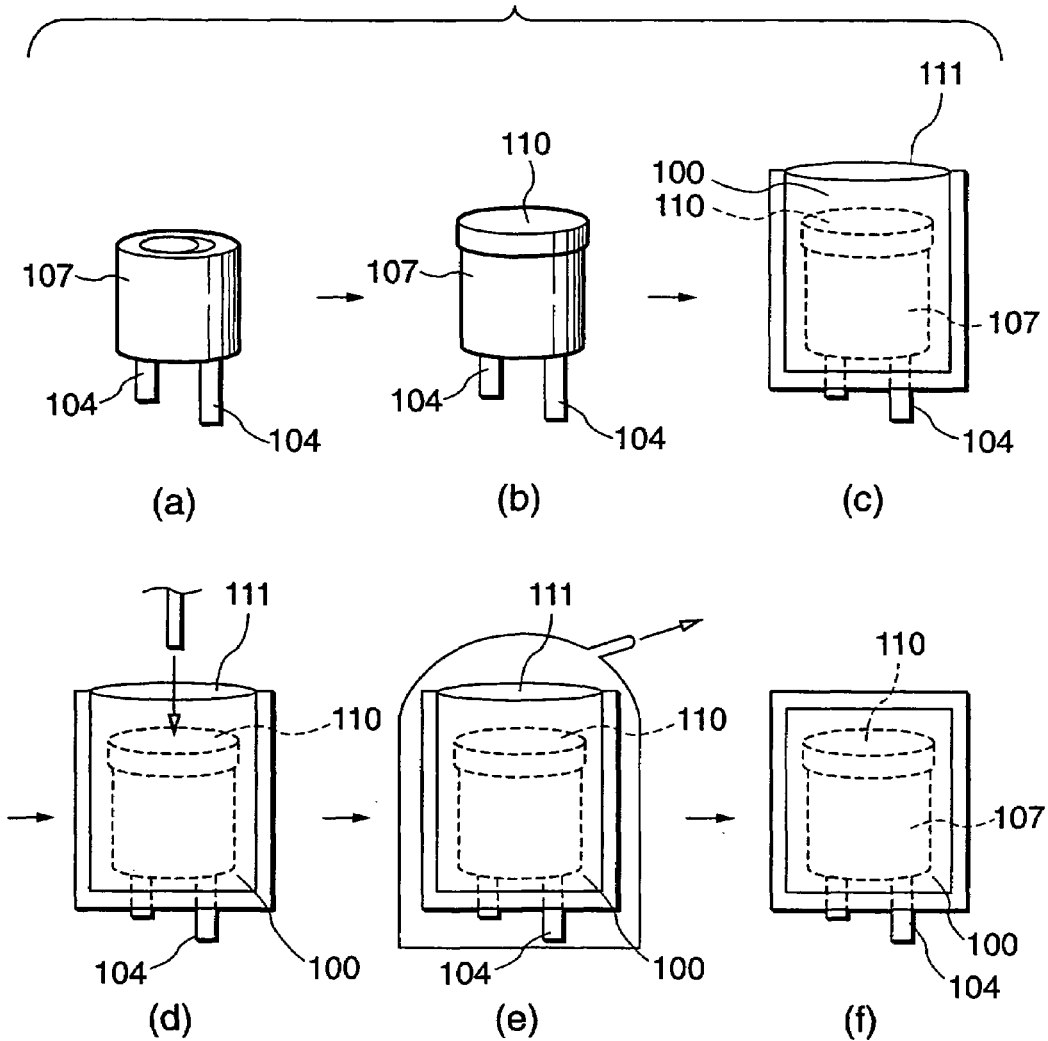
FIG. 28(a) through (f) are front views illustrating the production step.

This battery was prepared by a process as shown in FIG. 28.

Firstly, the electricity-generating element 107 was fixed in such an arrangement that the lead terminal 104 facing downward (step a). The foam-preventive material 110 was disposed covering entirely the other end of the electricity-generating element 107, and then fixed thereto with an adhesive. Subsequently, these parts were wrapped by a laminated resin sheet constituting the battery case 100 in such an arrangement that only the lead terminal 104 was exposed. The edge of the resin sheet was then heat-fused to seal the opening (step c). However, the battery case 100 had an opening 111 left on the foam-preventive material 110 side thereof. Subsequently, the electrolytic solution was injected onto the foam-preventive material 110 through the opening 111 (step d). Then, the electrolytic solution was absorbed by the foam-preventive material 110, and then penetrates into the separator disposed between the positive electrode plate and the negative electrode plate. Then, the air was removed from the interior of the battery case 100 by a vacuum-pump (step e). Finally, the opening 111 was heat-fused to seal the battery case. Thus, a battery 1 having a designed capacity of 500 mAh was obtained (step f).

In the present embodiment, the electrolytic solution is injected into the battery case through the foam-preventive material 110, preventing the electrolytic solution from hitting and bouncing off the electricity-generating element 107 and hence preventing the electricity-generating element from being attached to the inner area of the battery case 100 close to the opening 111. Further, even if bubbles burst in the electrolytic solution during the evacuation of the battery case 100, no spray can be scattered out of the electricity-generating element 107 because the upper end of the electricity-generating element 107 is covered by the foam-preventive material 110. Moreover, since the battery case 100 has been sealed on the lead terminal 104 side thereof prior to injection of the electrolytic solution, the battery prepared according to the present embodiment exhibits an excellent airtightness.

Batteries according to the preparation process of the present embodiment were subjected to the following test.

Firstly, 10 samples of a battery 12A according to the present embodiment were prepared. As a comparative example, 10 samples of a battery R18 prepared in the same manner as in the present embodiment except that the electrolytic solution was injected into the battery case at the collector lead side thereof without using the foam-preventive material 110 were prepared. Subsequently, these batteries were each charged with a constant current of 500 mA and charged at a constant voltage of 4.10 V (3 hours in total), and then discharged with a constant current of 500 mA to 2.75 V. These batteries were each then measured for capacity (capacity before test). These batteries were each stored at a temperature of 60° C. and 90% RH for 30 days, and then discharged under the same conditions as mentioned above. These batteries were each then measured for capacity (residual capacity). Further, these batteries were each again charged and discharged under the same conditions as mentioned above. These batteries were each then measured for capacity (recovered capacity). Moreover, these batteries were each observed to see if aluminum in the laminated film had been corroded and if the electrolytic solution had been leaked out of the battery case.

The results are set forth in Table 14. In this table, the symbol * indicates that the battery was observed corroded on aluminum. The symbol ** indicates that the battery was observed to have the electrolytic solution leaked out of the battery case in addition to corrosion of aluminum. The value of residual capacity and recovered capacity are represented by the percentage (%) based on the capacity before test.

TABLE 14

| Present embodiment (Battery 12A) | | | Comparative example | |
| --- | --- | --- | --- | --- |
| Capacity before test | Residual capacity | Recovered capacity | Capacity before test | |
| mAh | % | % | % | mAh | % |
| 558.3 | 100 | 65.7 | 77.6 | *540.5 | 100 |
| 541.7 | 100 | 66.2 | 78.5 | **525.0 | 100 |
| 550.7 | 100 | 65.2 | 77.3 | **530.0 | 100 |
| 566.7 | 100 | 66.2 | 77.9 | *538.2 | 100 |
| 541.7 | 100 | 64.6 | 76.9 | **536.3 | 100 |
| 550.0 | 100 | 63.6 | 75.8 | **518.0 | 100 |
| 541.7 | 100 | 64.6 | 76.9 | **523.1 | 100 |
| 550.0 | 100 | 65.2 | 77.3 | **531.7 | 100 |
| 550.0 | 100 | 66.7 | 78.8 | **550.1 | 100 |
| 550.0 | 100 | 63.6 | 75.8 | **541.3 | 100 |

As can be seen in Table 14, the comparative battery R18 tends to show less residual capacity and recovered capacity than the battery 12A of the present embodiment. This is because the comparative battery R18 underwent electrolysis reaction caused by water content in the air which had externally entered into the battery case. All the samples of the comparative battery R18 were observed corroded on aluminum. 8 out of the corroded samples were observed to have the electrolytic solution leaked out of the battery case from the collector lead. This defect, too, can be attributed to the air which had externally entered into the battery case.

On the other hand, the battery 12A of the present embodiment was observed showing neither electrolyte leakage nor aluminum corrosion. It was thus made obvious that the battery 12A prepared according to the present embodiment exhibits a better airtightness than the conventional batteries.

Further, the battery prepared according to the present invention is not liable to the drop of battery capacity, the leakage of electrolytic solution and the corrosion of metal even if the electrolytic solution used is a nonaqueous electrolytic solution containing a lithium salt. Moreover, in accordance with the preparation process of the invention, the injection of electrolytic solution and the evacuation of the battery case don't need to be carried out slowly and carefully, making it possible to efficiently prepare the battery. Further, by previously fixing a foam-preventive material to the electricity-generating element on the side thereof opposite the collector lead drawing side, the attachment of the electrolytic solution to the lead during handling at various steps or the injection of the electrolytic solution and the deviation in position during the evacuation can be prevented, making it possible to minimize the percent defective.

The foam-preventive material 110 is preferably fixed to the electricity-generating element 107 on the plane thereof opposite the plane from which the lead terminal 104 is drawn. The term "plane opposite the plane from which the collector lead of the electricity-generating element is drawn" as used herein is meant to indicate the plane perpendicular to the winding axis from which the lead is not drawn in the case of ellipsoidally wound electricity-generating element or the plane having no lead drawn therefrom opposite the plane from which the lead is drawn in the case of nearly rectangular electricity-generating element comprising flat electrode plates laminated on each other with a separating material interposed therebetween.

In the present embodiment, an unwoven polypropylene cloth was used as a foam-preventive material. Foam-preventive materials having the similar effect are not limited to unwoven polypropylene cloth. Examples of these materials include net, unwoven cloth, felt and porous material made of a polyolefin such as polypropylene and polyethylene.

The invention claimed is:

1. A nonaqueous secondary electrolytic battery comprising:
    an electricity-generating element comprising:
        a positive electrode plate and a negative electrode plate with a separating material interposed therebetween; and
        a battery case accommodating said electricity-generatina element therein,
    wherein said battery case has a portion which includes two resin sheets each comprising a heat fused layer, and a welded portion in which said resin sheets are welded together, being superimposed over each other so that each of said heat fused layers are integrated together;
    wherein the relationship X<Y is met, where X is a total thickness of said heat fused layers welded in said welded portion at an outer end thereof, and Y is a total thickness of said heat fused layers welded in said welded portion at an inner end thereof.

2. The nonaqueous secondary electrolytic battery according to claim 1, wherein said positive electrode plate and said negative electrode plate are wound about a winding axis, such that said electricity-generating element has an ellipsoidal cross-sectional shape, and said nonaciueous secondary electrolytic battery is produced by accommodating said electricity-generating element in said battery case, such that the winding axis is perpendicular to a plane of an opening of said battery case.

3. The nonaqueous secondary electrolytic battery according to claim 1, wherein said resin sheet is a metal-laminated film comprising a metal foil and a resin layer laminated on each other.

4. The nonaqueous secondary electrolytic battery according to claim 2, wherein said resin sheet is a metal-laminated film comprising a metal foil and a resin layer laminated on each other.

5. A nonaqueous secondary electrolytic battery comprising:
   an electricity-generating element having a positive electrode plate and a negative electrode plate opposed to each other with a separating material interposed therebetween, a positive lead terminal electrically connected to said positive electrode plate, and a negative lead terminal electrically connected to said negative electrode plate; and
   a battery case, which is made of a resin sheet having welded portions in which overlapped portions of said resin sheet are welded together, accommodating said electricity-generating element therein, said lead terminals extending through one of said welded portions;
   wherein said positive lead terminals is bent at a positive bent portion outside said battery case at a radius of from 0.5 mm to 4 mm; and
   said negative lead terminal is bent at a negative bent portion outside said battery case at a radius of from 0.5 mm to 4 mm.

6. The nonaqueous secondary electrolytic battery according to claim 5, wherein said positive bent portion or said negative bent portion is covered by a resin layer.

7. The nonaqueous secondary electrolytic battery according to claim 6, wherein said resin layer is a resin tube of material that is different from the material of said battery case.

8. The nonaqueous secondary electrolytic battery according to claim 6, wherein said resin layer is a partially extended portion of said resin sheet.

9. The nonaqueous secondary electrolytic battery according to claim 5, wherein there is no bent portion in said positive lead terminal except for said positive bent portion, and there is no bent portion in said negative lead terminal except for said negative bent portion.

* * * * *